US012516244B2

(12) United States Patent
Matsuyama et al.

(10) Patent No.: US 12,516,244 B2
(45) Date of Patent: *Jan. 6, 2026

(54) LIGHT ABSORPTION ANISOTROPIC LAYER, OPTICAL FILM, VIEWING ANGLE CONTROL SYSTEM, AND IMAGE DISPLAY DEVICE

(71) Applicant: FUJIFILM Corporation, Tokyo (JP)

(72) Inventors: Hiroshi Matsuyama, Kanagawa (JP); Wataru Hoshino, Kanagawa (JP); Shinya Watanabe, Kanagawa (JP); Fumitake Mitobe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,111

(22) Filed: Dec. 14, 2023

(65) Prior Publication Data

US 2024/0141233 A1 May 2, 2024

Related U.S. Application Data

(63) Continuation of application No. PCT/JP2022/024052, filed on Jun. 16, 2022.

(30) Foreign Application Priority Data

Jun. 28, 2021 (JP) ................. 2021-106818

(51) Int. Cl.
| | |
|---|---|
| *G02F 1/1333* | (2006.01) |
| *C09K 19/20* | (2006.01) |
| *C09K 19/22* | (2006.01) |
| *C09K 19/30* | (2006.01) |
| *G02B 5/30* | (2006.01) |

(52) U.S. Cl.
CPC .......... *C09K 19/2007* (2013.01); *C09K 19/22* (2013.01); *C09K 19/3068* (2013.01); *G02B 5/3016* (2013.01); *C09K 2019/2042* (2013.01); *C09K 2019/2064* (2013.01); *C09K 2019/2078* (2013.01); *C09K 2019/2085* (2013.01); *C09K 2019/3075* (2013.01)

(58) Field of Classification Search
CPC .... C09K 19/02; C09K 19/2007; C09K 19/22; C09K 19/3068; C09K 19/56; C09K 19/601; C09K 2019/2042; C09K 2019/2064; C09K 2019/2078; C09K 2019/2085; C09K 2019/3075; C09K 2019/0448; G02F 1/1333; G02F 1/1335; G02F 1/1323; G02F 1/133528; G02F 1/13363; G02B 5/30; G02B 5/3016

See application file for complete search history.

(56) References Cited

U.S. PATENT DOCUMENTS

| | | | |
|---|---|---|---|
| 6,277,502 B1 * | 8/2001 | Buchecker | G02F 1/133719 522/111 |
| 11,982,897 B2 * | 5/2024 | Shibata | G02B 5/30 |
| 2009/0153783 A1 | 6/2009 | Umemoto | |
| 2015/0378068 A1 | 12/2015 | Hatanaka | |
| 2019/0071571 A1 | 3/2019 | Takada et al. | |
| 2019/0250457 A1 | 8/2019 | Nishimura et al. | |
| 2022/0206302 A1 | 6/2022 | Ishiyama et al. | |
| 2023/0314854 A1 * | 10/2023 | Yoshinari | G02F 1/133757 349/96 |
| 2023/0358935 A1 * | 11/2023 | Nishimura | G02B 5/3016 |
| 2024/0141233 A1 * | 5/2024 | Matsuyama | C09K 19/56 |
| 2024/0142685 A1 * | 5/2024 | Nishimura | G02B 1/11 |

FOREIGN PATENT DOCUMENTS

| | | |
|---|---|---|
| JP | 2006-091871 A | 4/2006 |
| JP | 2009-145776 A | 7/2009 |
| JP | 4902516 B2 | 3/2012 |
| JP | 2016-027387 A | 2/2016 |
| JP | 2020-181150 A | 11/2020 |
| WO | 2017/195833 A1 | 11/2017 |
| WO | 2018/079854 A1 | 5/2018 |
| WO | 2021/054099 A1 | 3/2021 |

OTHER PUBLICATIONS

International Search Report issued in PCT/JP2022/024052 on Sep. 6, 2022.
Written Opinion issued in PCT/JP2022/024052 on Sep. 6, 2022.
International Preliminary Report on Patentability completed by WIPO on Dec. 14, 2023 in connection with International Patent Application No. PCT/JP2022/024052.
Office Action, which was issued by the Korean Intellectual Property Office on Sep. 15, 2025, in connection with Korean Patent Application No. 10-2023-7043081.

* cited by examiner

*Primary Examiner* — Geraldina Visconti
(74) *Attorney, Agent, or Firm* — Edwards Neils LLC; Jean C. Edwards, Esq.

(57) ABSTRACT

A light absorption anisotropic layer which has high contrast and can suppress hue change of an image reflected by surroundings relative to an original image when used in a viewing angle control system, an optical film using the light absorption anisotropic layer, a viewing angle control system, and an image display device. The light absorption anisotropic layer is formed of a liquid crystal composition containing a liquid crystalline compound, a dichroic substance, and an alignment agent. The liquid crystalline compound is in a liquid crystal state of a smectic phase, a content of the dichroic substance is 5.0% by mass or more with respect to a total solid content mass of the liquid crystal composition, and an angle θ between a transmittance central axis of the light absorption anisotropic layer and a normal direction of a surface of the light absorption anisotropic layer is between 0° and 45°.

20 Claims, No Drawings

LIGHT ABSORPTION ANISOTROPIC LAYER, OPTICAL FILM, VIEWING ANGLE CONTROL SYSTEM, AND IMAGE DISPLAY DEVICE

CROSS-REFERENCE TO RELATED APPLICATIONS

This application is a continuation of PCT International Application No. PCT/JP2022/024052 filed on Jun. 16, 2022, which was published under PCT Article 21(2) in Japanese, and which claims priority under 35 U.S.C. § 119 (a) to Japanese Patent Application No. 2021-106818, filed on Jun. 28, 2021. The above applications are hereby expressly incorporated by reference, in their entirety, into the present application.

BACKGROUND OF THE INVENTION

1. Field of the Invention

The present invention relates to a light absorption anisotropic layer, an optical film, a viewing angle control system, and an image display device.

2. Description of the Related Art

In a case where an in-vehicle display such as a car navigation system is used, there is a problem in that light emitted upward from a display screen is reflected on a windshield or the like and interferes with driving.

For the purpose of solving the above-described problem, for example, JP4902516B discloses a viewing angle control system including a polarizer (light absorption anisotropic layer) which contains an absorption dichroic substance, in which an angle between an absorption axis and a normal line of a film surface is 0° to 45°.

SUMMARY OF THE INVENTION

As a result of studying on the viewing angle control system disclosed in JP4902516B, the present inventors have found that reflection of an image on window glass (windshield) positioned above the in-vehicle display is reduced, but have found that there is room for improvement in difference between a transmittance of the light absorption anisotropic layer from a front direction and a transmittance from an oblique direction (hereinafter, abbreviated as "contrast"), and the hue of the reflected image which partially remains is greatly changed from the original tint to redness, greenness, blueness, or the like, and as a result, there is a problem that the reflected image with reduced brightness is conspicuous again.

An object of the present invention is to provide a light absorption anisotropic layer which has high contrast and can suppress hue change of an image reflected by surroundings (for example, window glass) relative to an original image in a case of being used in a viewing angle control system, an optical film using the light absorption anisotropic layer, a viewing angle control system, and an image display device.

As a result of conducting an intensive study to achieve the above-described object, the present inventors have found that, regarding a light absorption anisotropic layer formed of a liquid crystal composition containing a liquid crystalline compound, a dichroic substance, and an alignment agent, in a case where the liquid crystalline compound exhibits a liquid crystal state of a smectic phase and a content of the dichroic substance is 5.0% by mass or more with respect to a total solid content mass of the liquid crystal composition, the optically anisotropic layer has high contrast and can suppress hue change of an image reflected by surroundings relative to an original image in a case of being used in a viewing angle control system, thereby completing the present invention.

That is, the present inventors have found that the above-described object can be achieved by employing the following configurations.

[1] A light absorption anisotropic layer formed of a liquid crystal composition containing a liquid crystalline compound, a dichroic substance, and an alignment agent,
in which the liquid crystalline compound is a liquid crystalline compound exhibiting a liquid crystal state of a smectic phase,
a content of the dichroic substance is 5.0% by mass or more with respect to a total solid content mass of the liquid crystal composition, and
an angle $\theta$ between a transmittance central axis of the light absorption anisotropic layer and a normal direction of a surface of the light absorption anisotropic layer is 0° or more and 45° or less.

[2] The light absorption anisotropic layer according to [1], in which the content of the dichroic substance is 8.0% by mass or more with respect to the total solid content mass of the liquid crystal composition.

[3] The light absorption anisotropic layer according to [1] or [2], in which the content of the dichroic substance is 10.0% by mass or more with respect to the total solid content mass of the liquid crystal composition.

[4] The light absorption anisotropic layer according to any one of [1] to [3], in which the content of the dichroic substance is 2 to 100 parts by mass with respect to 1 part by mass of the alignment agent.

[5] The light absorption anisotropic layer according to any one of [1] to [4], in which the dichroic substance includes at least one dichroic substance having a maximal absorption wavelength in a wavelength range of 370 to 550 nm and at least one dichroic substance having a maximal absorption wavelength in a wavelength range of 500 to 700 nm.

[6] The light absorption anisotropic layer according to any one of [1] to [5], in which a thickness is 1.5 µm or more.

[7] The light absorption anisotropic layer according to any one of [1] to [6], in which a thickness is 4.0 µm or less.

[8] The light absorption anisotropic layer according to any one of [1] to [7], in which the liquid crystalline compound is a liquid crystalline compound exhibiting any liquid crystal state of a smectic B phase, a smectic E phase, a smectic F phase, a smectic G phase, a smectic H phase, a smectic I phase, a smectic J phase, a smectic K phase, or a smectic L phase.

[9] The light absorption anisotropic layer according to any one of [1] to [8], in which the alignment agent is a compound represented by Formula (B1) or (B2) described later.

[10] The light absorption anisotropic layer according to any one of [1] to [8], in which the alignment agent is at least one compound selected from the group consisting of a nonionic silane compound and an ionic compound.

[11] An optical film comprising:

a transparent film base material; and the light absorption anisotropic layer according any one of [1] to [10], which is provided on the transparent film base material.

[12] The optical film according to [11], further comprising:

an alignment film between the transparent film base material and the light absorption anisotropic layer.

[13] A viewing angle control system comprising:

a polarizer having an absorption axis in an in-plane direction; and the light absorption anisotropic layer according to any one of [1] to [10] or the optical film according to [11] or [12].

[14] An image display device comprising:

a display element; and the viewing angle control system according to [13], in which the viewing angle control system is disposed on at least one main surface of the display element.

[15] The image display device according to [14], in which the light absorption anisotropic layer included in the viewing angle control system is disposed on a viewing side with respect to the polarizer included in the viewing angle control system.

According to the present invention, it is possible to provide a light absorption anisotropic layer which has high contrast and can suppress hue change of an image reflected by surroundings (for example, window glass) relative to an original image in a case of being used in a viewing angle control system, an optical film using the light absorption anisotropic layer, a viewing angle control system, and an image display device.

DESCRIPTION OF THE PREFERRED EMBODIMENTS

Hereinafter, the present invention will be described in detail.

Although configuration requirements to be described below are described based on representative embodiments of the present invention, the present invention is not limited to the embodiments.

Any numerical range expressed using "to" in the present specification refers to a range including the numerical values before and after the "to" as a lower limit value and an upper limit value, respectively.

In addition, in the present specification, parallel and orthogonal do not respectively indicate parallel and orthogonal in a strict sense, but respectively indicate a range of parallel±5° and a range of orthogonal±5°.

In addition, in the present specification, concepts of a liquid crystalline composition and a liquid crystalline compound also include those that no longer exhibit liquid crystallinity due to curing or the like.

In addition, in the present specification, substances corresponding to respective components may be used alone or in combination of two or more kinds thereof. Here, in a case where two or more kinds of substances corresponding to respective components are used in combination, the content of the components indicates the total content of the substances used in combination unless otherwise specified.

In addition, in the present specification, "(meth)acrylate" denotes "acrylate" or "methacrylate", "(meth)acryl" denotes "acryl" or "methacryl", and "(meth)acryloyl" denotes "acryloyl" or "methacryloyl".

Substituent W

A substituent W used in the present specification represents any of the following groups.

Examples of the substituent W include a halogen atom, an alkyl group having 1 to 20 carbon atoms, a halogenated alkyl group having 1 to 20 carbon atoms, a cycloalkyl group having 1 to 20 carbon atoms, an alkylcarbonyl group having 1 to 10 carbon atoms, an alkyloxycarbonyl group having 1 to 10 carbon atoms, an alkylcarbonyloxy group having 1 to 10 carbon atoms, an alkylamino group having 1 to 10 carbon atoms, an alkylaminocarbonyl group, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group (also referred to as a hetero ring group), a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), a sulfate group (—OSO$_3$H), and other known substituents.

Details of the substituent are described in paragraph [0023] of JP2007-234651A.

In addition, the substituent W may be a group represented by Formula (W1).

$$*\text{-LW-SPW-Q} \tag{W1}$$

In Formula (W1), LW represents a single bond or a divalent linking group, SPW represents a divalent spacer group, Q represents Q1 or Q2 in Formula (A-1) described later, and * represents a bonding position.

Examples of the divalent linking group represented by LW include —O—, —(CH$_2$)$_g$—, —(CF$_2$)$_g$—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— (Z, Z', and Z" independently represent a hydrogen atom, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O) O—, —O(O)S(O)O—, —SC(O)—, and —C(O)S—. LW may be a group in which two or more of these groups are combined (hereinafter, also abbreviated as "L-C").

Examples of the divalent spacer group represented by SPW include a linear, branched, or cyclic alkylene group having 1 to 50 carbon atoms, and a heterocyclic group having 1 to 20 carbon atoms.

The carbon atoms of the alkylene group and the heterocyclic group may be substituted with —O—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z'')—, —N(Z'')—C(O)—C(Z)=C(Z')—, —C(Z)=C(Z')—C(O)—S—, —S—C(O)—C(Z)=C(Z')—, —C(Z)=N—N=C(Z')— (here, Z, Z', and Z'' each independently represent a hydrogen atom, an alkyl group having 1 to 4 carbon atoms, a cycloalkyl group, an aryl group, a cyano group, or a halogen atom), —C≡C—, —N=N—, —S—, —C(S)—, —S(O)—, —SO$_2$—, —(O)S(O)O—, —O(O)S(O)O—, —SC(O)—, —C(O)S—, or a group obtained by combining two or more of these groups (hereinafter, also abbreviated to as "SP-C").

The hydrogen atom of the above-described alkylene group or the hydrogen atom of the heterocyclic group may be substituted with a halogen atom, a cyano group, —Z$^H$, —OH, —OZ$^H$, —COOH, —C(O)Z$^H$, —C(O)OZ$^H$, —OC(O)Z$^H$, —OC(O)OZ$^H$, —NZ$^H$Z$^{H_1}$, —NZ$^H$C(O)Z$^{H_1}$, —NZ$^H$C(O)OZ$^{H_1}$, —C(O)NZ$^H$Z$^{H_1}$, —OC(O)NZ$^H$Z$^{H_1}$, —NZ$^H$C(O)NZ$^{H_1}$OZ$^{H_{1''}}$, —SH, —SZ$^H$, —C(S)Z$^H$, —C(O)SZ$^H$, or —SC(O)Z$^H$ (hereinafter, also abbreviated as "SP-H"). Here, Z$^H$ and Z$^{H_1}$ represent an alkyl group having 1 to 10 carbon atoms, a halogenated alkyl group, or -L-CL (L represents a single bond or a divalent linking group, and specific examples of the divalent linking group are the same as those for LW and SPW described above; CL represents a crosslinkable group, examples thereof include a group represented by Q1 or Q2 in Formula (A-1) described later, and a polymerizable group represented by Formulae (P-1) to (P-30) described later is preferable).

Light Absorption Anisotropic Layer

The light absorption anisotropic layer according to the embodiment of the present invention is a light absorption anisotropic layer formed of a liquid crystal composition containing a liquid crystalline compound, a dichroic substance, and an alignment agent.

In addition, in the light absorption anisotropic layer according to the embodiment of the present invention, the liquid crystalline compound is a liquid crystalline compound exhibiting a liquid crystal state of a smectic phase.

In addition, in the light absorption anisotropic layer according to the embodiment of the present invention, a content of the dichroic substance is 5.0% by mass or more with respect to a total solid content mass of the liquid crystal composition.

In addition, in the light absorption anisotropic layer according to the embodiment of the present invention, an angle θ between a transmittance central axis of the light absorption anisotropic layer and a normal direction of a surface of the light absorption anisotropic layer (hereinafter, also abbreviated as "transmittance central axis angle θ") is 0° or more and 45° or less.

Here, the transmittance central axis is a direction in which the highest transmittance is exhibited in a case where the transmittance is measured by changing an inclination angle (polar angle) and an inclination direction (azimuthal angle) with respect to a normal direction of a surface of the light absorption anisotropic layer.

Specifically, Mueller matrix at a wavelength of 550 nm is measured using AxoScan OPMF-1 (manufactured by Opto Science, Inc.). More specifically, in the measurement, the azimuthal angle at which the transmittance central axis is inclined is first searched for, the Mueller matrix at a wavelength of 550 nm is measured while the polar angle which is the angle with respect to the surface of the light absorption anisotropic layer in the normal direction is changed from −70° to 70° at intervals of 1° in the surface (the plane which has the transmittance central axis and is orthogonal to the layer surface) having the normal direction of the light absorption anisotropic layer along the azimuthal angle thereof, and the transmittance of the light absorption anisotropic layer is derived. As a result, the direction at which the highest transmittance is exhibited is defined as the transmittance central axis.

The transmittance central axis denotes a direction of ab absorption axis (major axis direction of a molecule) of the dichroic substance contained in the light absorption anisotropic layer.

In the present invention, as a light absorption anisotropic layer formed of a liquid crystal composition containing a liquid crystalline compound, a dichroic substance, and an alignment agent, by using a light absorption anisotropic layer in which the liquid crystalline compound exhibits a liquid crystal state of a smectic phase, a content of the dichroic substance is 5.0% by mass or more with respect to a total solid content mass of the liquid crystal composition, and the transmittance central axis angle θ is 0° or more and 45° or less, the light absorption anisotropic layer has high contrast and can suppress hue change of an image reflected by surroundings relative to an original image in a case of being used in a viewing angle control system.

The reason for this is not clear, but the present inventors presume as follows.

First, in the light absorption anisotropic layer according to the embodiment of the present invention, since the liquid crystalline compound and the dichroic substance are aligned using the alignment agent, the transmittance central axis angle θ is adjusted.

Since the content of the dichroic substance in the light absorption anisotropic layer according to the embodiment of the present invention is high, it is considered that sufficient absorption is exhibited and the contrast is high.

In addition, in the light absorption anisotropic layer according to the embodiment of the present invention, since the liquid crystalline compound exhibiting a liquid crystal state of a smectic phase is used, it is considered that the contrast is high and it is possible to suppress the hue change of an image reflected by surroundings relative to an original image.

In the present invention, the transmittance central axis angle θ is preferably 0° or more and less than 45°, more preferably 0° or more and 35° or less, and still more preferably 0° or more and less than 35°.

Liquid Crystal Composition

The light absorption anisotropic layer according to the embodiment of the present invention is formed of a liquid crystal composition containing a liquid crystalline compound, a dichroic substance, and an alignment agent. In the present invention, since a liquid crystalline compound exhibiting a liquid crystal state of a smectic phase is used as the liquid crystalline compound, it is preferable that the light absorption anisotropic layer according to the embodiment of the present invention is a light absorption anisotropic layer formed by immobilizing the liquid crystal composition into the liquid crystal state of a smectic phase.

In addition, the liquid crystal composition may contain a solvent, a polymerization initiator, a polymerizable compound, an interface improver, and other additives.

Hereinafter, each component will be described.

Liquid Crystalline Compound

The liquid crystal composition contains a liquid crystalline compound.

In the present invention, as the liquid crystalline compound, a liquid crystalline compound exhibiting a liquid crystal state of a smectic phase (hereinafter, also abbreviated as "smectic liquid crystalline compound").

Here, examples of the smectic phase include a smectic A phase and a smectic C phase, and a higher-order smectic phase (such as a smectic B phase, a smectic E phase, a smectic F phase, a smectic G phase, a smectic H phase, a smectic I phase, a smectic J phase, a smectic K phase, and a smectic L phase) may also be employed.

In addition, the liquid crystalline compound may exhibit a nematic phase in addition to the smectic phase.

In the present invention, from the reason that the contrast is higher, it is preferable that the liquid crystalline compound is a liquid crystalline compound exhibiting any liquid crystal state of a smectic B phase, a smectic E phase, a smectic F phase, a smectic G phase, a smectic H phase, a smectic I phase, a smectic J phase, a smectic K phase, or a smectic L phase.

As the smectic liquid crystalline compound, a compound represented by Formula (A-1) is preferable.

Q1-V1-SP1-X1-(Ma-La)na-X2-SP2-V2-Q2    Formula (A-1)

In Formula (A-1), Q1 and Q2 each independently represent a polymerizable group.

In addition, V1, V2, X1, and X2 each independently represent a single bond or a divalent linking group.

In addition, SP1 and SP2 each independently represent a divalent spacer group.

In addition, Ma represents an aromatic ring, an aliphatic ring, or a heterocyclic ring, which may have a substituent. However, a plurality of Ma's may be the same or different from each other.

In addition, La represents a single bond or a divalent linking group. However, a plurality of La's may be the same or different from each other.

In addition, na represents an integer of 2 to 10.

As the polymerizable group represented by Q1 and Q2, a polymerizable group which is radically polymerizable (radically polymerizable group) or a polymerizable group which is cationically polymerizable (cationically polymerizable group) is preferable.

As the radically polymerizable group, a known radically polymerizable group can be used, and an acryloyloxy group or a methacryloyloxy group is preferable. It has been known that the acryloyloxy group tends to have a high polymerization rate, and the acryloyloxy group is preferable from the viewpoint of improving productivity, but the methacryloyloxy group can also be used as the polymerizable group.

As the cationically polymerizable group, a known cationically polymerizable group can be used, and examples thereof include an alicyclic ether group, a cyclic acetal group, a cyclic lactone group, a cyclic thioether group, a spiroorthoester group, and a vinyloxy group. Among these, an alicyclic ether group or a vinyloxy group is preferable, and an epoxy group, an oxetanyl group, or a vinyloxy group is more preferable.

Preferred examples of the polymerizable group include polymerizable groups represented by Formulae (P-1) to (P-30).

(P-1)

(P-2)

(P-3)

(P-4)

(P-5)

(P-6)

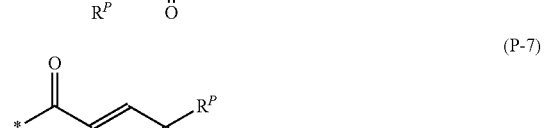
(P-7)

(P-8)

(P-9)

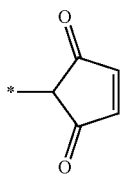 (P-10)

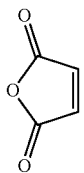 (P-11)

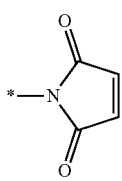 (P-12)

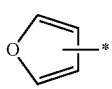 (P-13)

 (P-14)

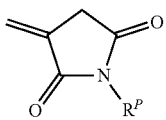 (P-15)

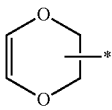 (P-16)

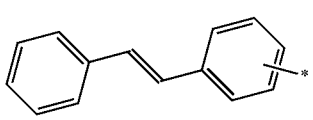 (P-17)

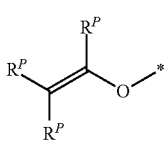 (P-18)

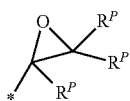 (P-19)

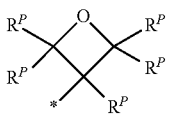 (P-20)

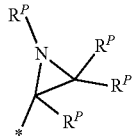 (P-21)

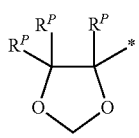 (P-22)

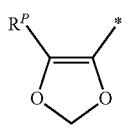 (P-23)

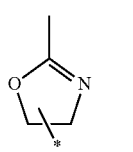 (P-24)

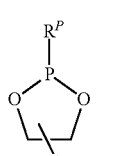 (P-25)

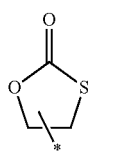 (P-26)

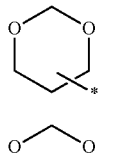 (P-27)

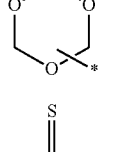 (P-28)

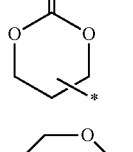 (P-29)

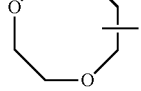 (P-30)

In Formulae (P-1) to (P-30), $R^P$ represents a hydrogen atom, a halogen atom, a linear, branched, or cyclic alkylene group having 1 to 10 carbon atoms, a halogenated alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group (also referred to as a heterocyclic ring group), a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), or a sulfate group (—OSO$_3$H). A plurality of $R^P$'s may be the same or different from each other.

Among these, as the radically polymerizable group, the vinyl group represented by Formula (P-1), the butadiene group represented by Formula (P-2), the (meth)acryloyloxy group represented by Formula (P-4), the (meth)acrylamide group represented by Formula (P-5), the vinyl acetate group represented by Formula (P-6), the fumaric acid ester group represented by Formula (P-7), the styryl group represented by Formula (P-8), the vinylpyrrolidone group represented by Formula (P-9), the maleic acid anhydride represented by Formula (P-11), or the maleimide group represented by Formula (P-12) is preferable; and as the cationically polymerizable group, the vinyl ether group represented by Formula (P-18), the epoxy group represented by Formula (P-19), or the oxetanyl group represented by Formula (P-20) is preferable.

In Formula (A-1), examples of the divalent linking group represented by one aspect of V1, V2, X1, X2, and La include —O—, —(CH$_2$)$_g$—, —(CF$_2$)$_g$—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z'')—, —N(Z'')—C(O)—C(Z)=C(Z')—, —C(Z)=C(Z')—C(O)—S—, —S—C(O)—C(Z)=C(Z')—, —C(Z)=N—N=C(Z')— (Z, Z', and Z'' independently represent a hydrogen atom, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O)O—, —O(O)S(O)O—, —SC(O)—, and —C(O)S—. V1, V2, X1, X2, and La may represent a group obtained by combining two or more of these groups.

In Formula (A-1), examples of the divalent spacer group represented by SP1 and SP2 include a linear, branched, or cyclic alkylene group having 1 to 50 carbon atoms and a heterocyclic group having 1 to 20 carbon atoms.

The carbon atoms of the alkylene group and the heterocyclic group may be substituted with —O—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z'')—, —N(Z'')—C(O)—C(Z)=C(Z')—, —C(Z)=C(Z')—C(O)—S—, —S—C(O)—C(Z)=C(Z')—, —C(Z)=N—N=C(Z')— (here, Z, Z', and Z'' each independently represent a hydrogen atom, an alkyl group having 1 to 4 carbon atoms, a cycloalkyl group, an aryl group, a cyano group, or a halogen atom), —C≡C—, —N=N—, —S—, —C(S)—, —S(O)—, —SO$_2$—, —(O)S(O)O—, —O(O)S(O)O—, —SC(O)—, —C(O)S—, or a group obtained by combining two or more of these groups.

The hydrogen atom of the above-described alkylene group or the hydrogen atom of the heterocyclic group may be substituted with a halogen atom, a cyano group, —$Z^H$, —OH, —O$Z^H$, —COOH, —C(O)$Z^H$, —C(O)O$Z^H$, —OC(O)$Z^H$, —OC(O)O$Z^H$, —N$Z^H Z^{Hh}$, —N$Z^H$C(O)$Z^{Hh}$, —N$Z^H$C(O)O$Z^{Hh}$, —C(O)N$Z^H Z^{Hh}$, —OC(O)N$Z^H Z^{Hh}$, —N$Z^H$C(O)N$Z^{Hh}$O$Z^{Hh}$, —SH, —S$Z^H$, —C(S)$Z^H$, —C(O)S$Z^H$, or —SC(O)$Z^H$. Here, $Z^H$, $Z^{Hh}$, and Z'' each independently represent an alkyl group having 1 to 10 carbon atoms, a halogenated alkyl group, or -L-Q (L represents a single bond or a divalent linking group, and specific examples of the divalent linking group are the same as those for V1 described above; Q represents a crosslinkable group, examples thereof include the group represented by Q1 or Q2 described above, and the polymerizable group represented by Formulae (P-1) to (P-30) described above is preferable).

In Formula (A-1), MA represents an aromatic ring, an aliphatic ring, or a heterocyclic ring, which may have a substituent and preferably a 4- to 15-membered ring. MA may represent a monocyclic ring or a fused ring, and a plurality of MA's may be the same or different from each other.

Examples of the aromatic ring represented by MA include a phenylene group, a naphthylene group, a fluorene-diyl group, an anthracene-diyl group, and a tetracene-diyl group. From the viewpoint of design diversity of the mesogenic skeleton and the availability of raw materials, a phenylene group or a naphthylene group is preferable.

Specific examples of the aliphatic ring represented by MA include a cyclopentylene group and a cyclohexylene group, and carbon atoms thereof may be substituted with —O—, —Si(CH$_3$)$_2$—, —N(Z)—, —C(O)—, (Z represents a hydrogen atom, an alkyl group having 1 to 4 carbon atoms, a cycloalkyl group, an aryl group, a cyano group, or a halogen atom), —S—, —C(S)—, —S(O)—, —SO$_2$—, or a group obtained by combining two or more of these groups.

Examples of atoms other than carbon constituting the heterocyclic ring represented by MA include a nitrogen atom, a sulfur atom, and an oxygen atom. In a case where the heterocyclic ring has a plurality of atoms other than carbon, constituting a ring, these atoms may be the same or different from each other. Specific examples of the heterocycle include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, a thienooxazole-diyl group, and the following structures (II-1) to (II-4).

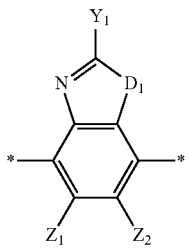

(II-1)

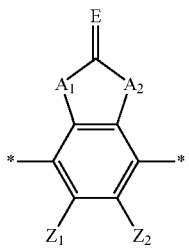

(II-2)

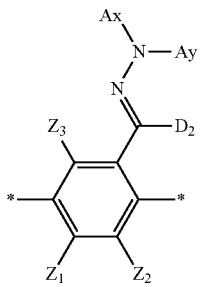

(II-3)

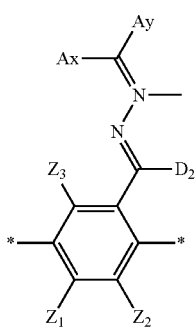

(II-4)

In Formulae (II-1) to (II-4), $D_1$ represents —S—, —O—, or —$NR^{11}$—, and $R^{11}$ represents a hydrogen atom or an alkyl group having 1 to 6 carbon atoms.

$Y_1$ represents an aromatic hydrocarbon group having 6 to 12 carbon atoms or an aromatic heterocyclic group having 3 to 12 carbon atoms.

$Z_1$, $Z_2$, and $Z_3$ each independently represent a hydrogen atom, an aliphatic hydrocarbon group having 1 to 20 carbon atoms, an alicyclic hydrocarbon group having 3 to 20 carbon atoms, a monovalent aromatic hydrocarbon group having 6 to 20 carbon atoms, a halogen atom, a cyano group, a nitro group, —$NR^{12}R^{13}$, or $SR^{12}$. Here, $Z^1$ and $Z^2$ may be bonded to each other to form an aromatic ring or an aromatic heterocyclic ring, and $R^{12}$ and $R^{13}$ each independently represent a hydrogen atom or an alkyl group having 1 to 6 carbon atoms.

$A_1$ and $A_2$ each independently represent a group selected from the group consisting of —O—, —$NR^{21}$— ($R^{21}$ represents a hydrogen atom or a substituent), —S—, and —CO—.

E represents a non-metal atom of a Group 14 to a Group 16, to which a hydrogen atom or a substituent may be bonded.

Ax represents an organic group having 2 to 30 carbon atoms, which has at least one aromatic ring selected from the group consisting of an aromatic hydrocarbon ring and an aromatic heterocyclic ring.

Ay represents a hydrogen atom, an alkyl group having 1 to 6 carbon atoms, which may have a substituent, or an organic group having 2 to 30 carbon atoms, which has at least one aromatic ring selected from the group consisting of an aromatic hydrocarbon ring and an aromatic heterocyclic ring, in which the aromatic rings of Ax and Ay may have a substituent and Ax and Ay may be bonded to each other to form a ring.

$D_2$ represents a hydrogen atom or an alkyl group having 1 to 6 carbon atoms, which may have a substituent.

In Formula (II-2), in a case where $Y_1$ represents an aromatic hydrocarbon group having 6 to 12 carbon atoms, the aromatic hydrocarbon group may be monocyclic or polycyclic. In a case where $Y_1$ represents an aromatic heterocyclic group having 3 to 12 carbon atoms, the aromatic heterocyclic group may be monocyclic or polycyclic.

In Formula (II-2), in a case where $A_1$ and $A_2$ represent —$NR^{21}$—, the substituent as $R^{21}$ can refer to, for example, description in paragraphs 0035 to 0045 of JP2008-107767A, and the content thereof is incorporated in the present specification.

In Formula (II-2), in a case where X represents a non-metal atom of Group 14 to Group 16, to which a substituent may be bonded, =O, =S, =NR', or =C(R')R' is preferable. R' represents a substituent, as the substituent, for example, the description in paragraphs [0035] to [0045] of JP2008-107767A can be referred to, and a nitrogen atom is preferable.

Examples of the substituent that an aromatic ring, an aliphatic ring, or a heterocyclic ring as MA in Formula (A-1) may have include a halogen atom, an alkyl group having 1 to 20 carbon atoms, a halogenated alkyl group having 1 to 20 carbon atoms, a cycloalkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), a sulfate group (—OSO$_3$H), and other known substituents.

Details of the substituent are described in paragraph [0023] of JP2007-234651A.

In Formula (A-1), na represents an integer of 2 to 10, more preferably an integer of 2 to 8.

Examples of the smectic liquid crystalline compound include compounds described in paragraphs [0033] to [0039] of JP2008-19240A, paragraphs [0037] to [0041] of JP2008-214269A, and paragraphs [0033] to [0040] of JP2006-215437A, and structures shown below, but the smectic liquid crystalline compound is not limited thereto.
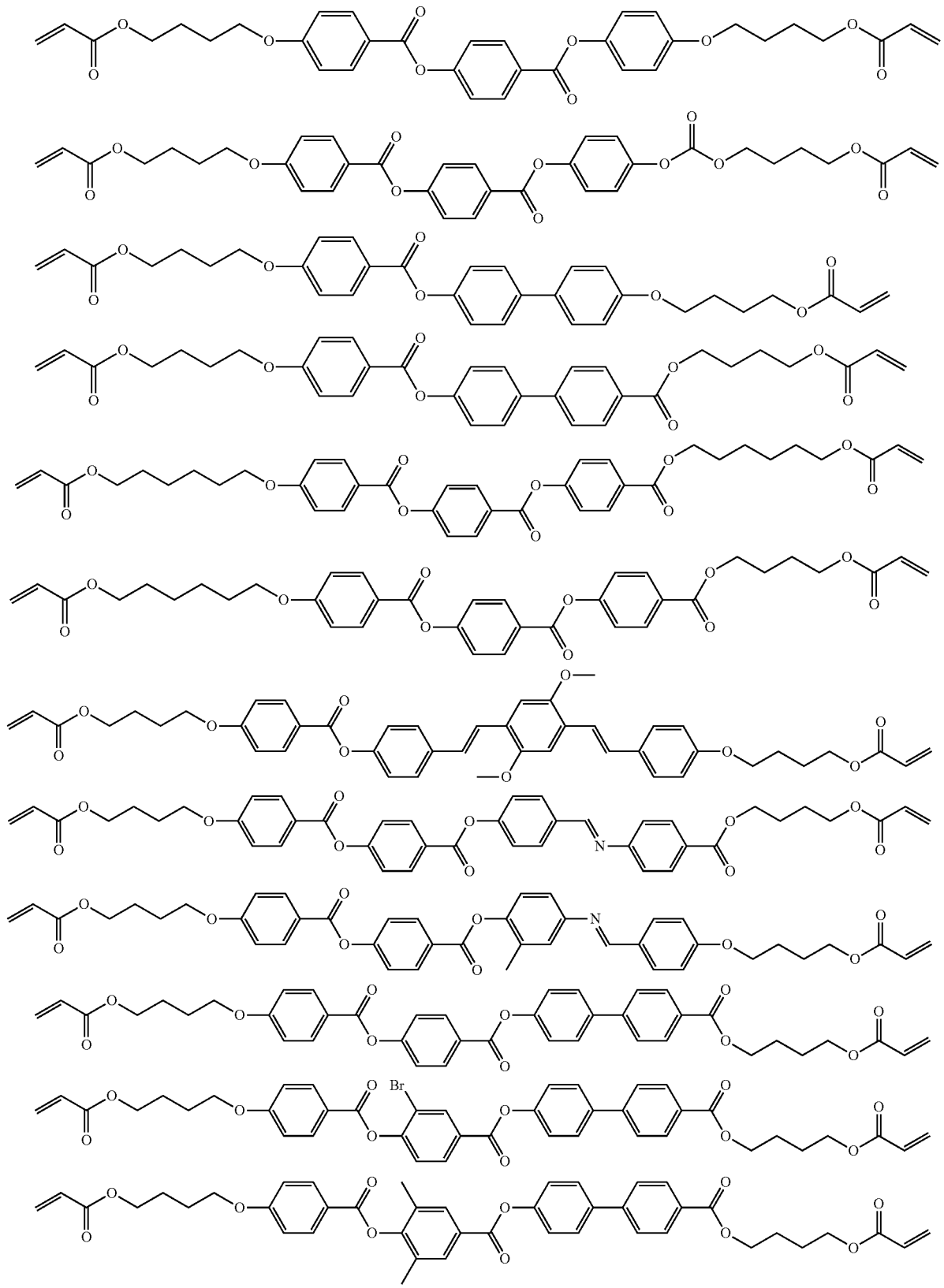

-continued
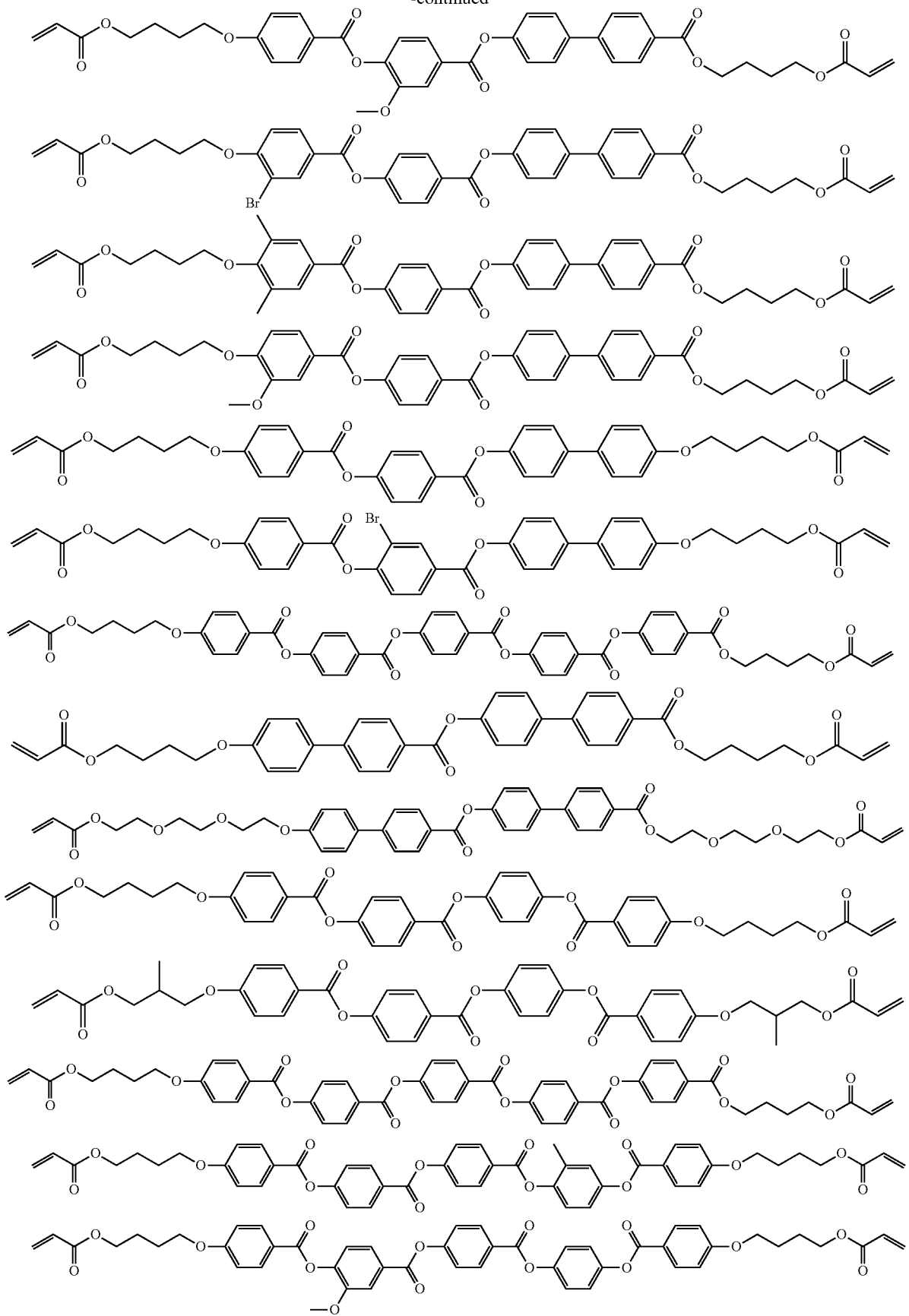

-continued
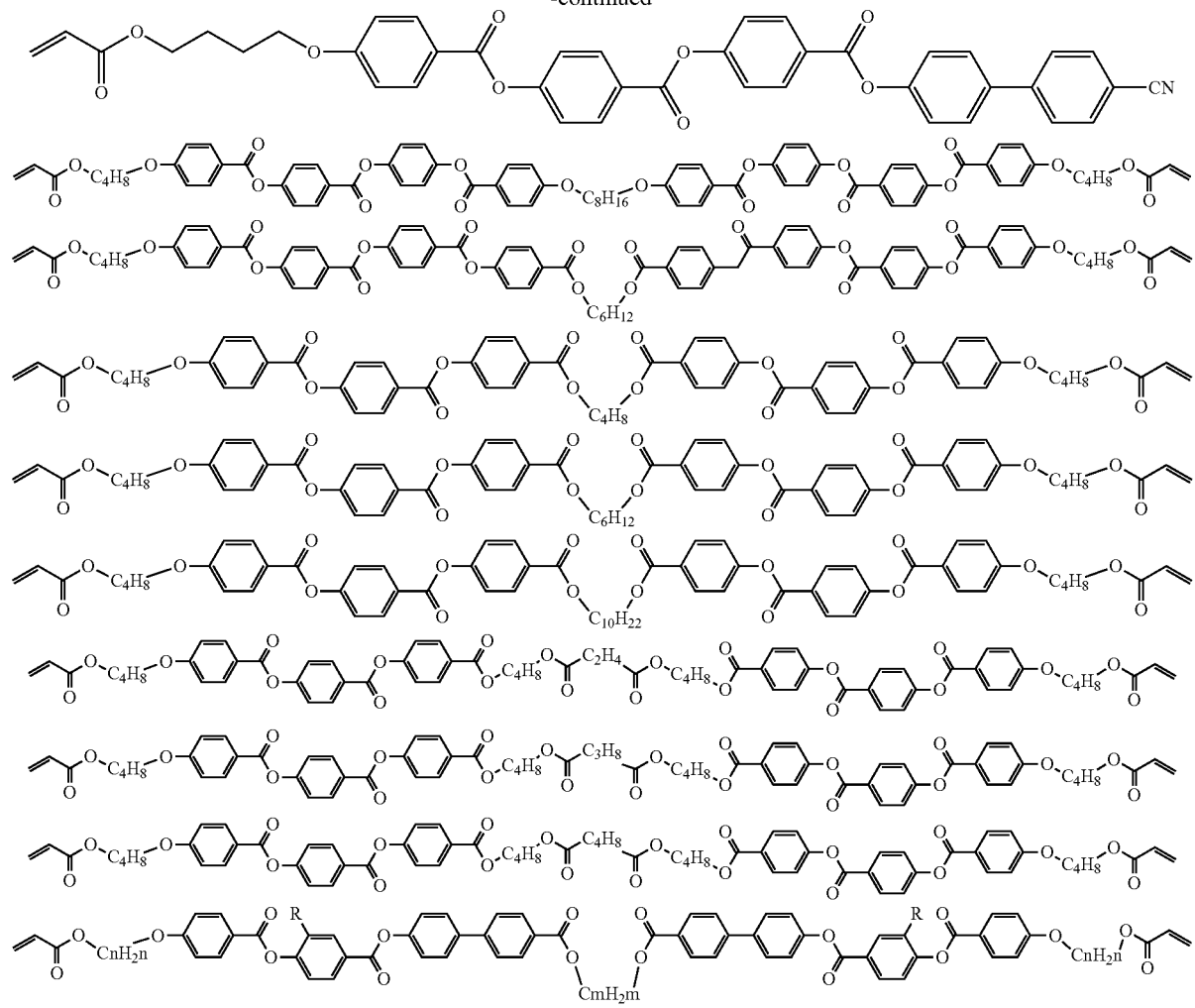
| n | m | R |
|---|---|---|
| 4 | 4 | H |
| 4 | 6 | H |
| 4 | 10 | H |
| 6 | 10 | H |
| 6 | 12 | H |
| 4 | 8 | OCH3 |
| 4 | 12 | OCH3 |
| 6 | 10 | Br |
| 6 | 12 | Br |
| 8 | 12 | OCH3 |
| SP | L | R |
|---|---|---|
| —(CH2)4— | —(CH2)3— | H |
| —(CH2)4— | —(CH2)3— | Br |
| —(CH2)4— | —(CH2)3— | OCH3 |
| —CH2CH(CH3)CH2— | —(CH2)3— | H |
| —(CH2CH2O)2CH2CH3— | —(CH2)3— | H |
| —(CH2CH2O)2CH2CH3— | —(CH2CH2O)2CH2CH3— | H |
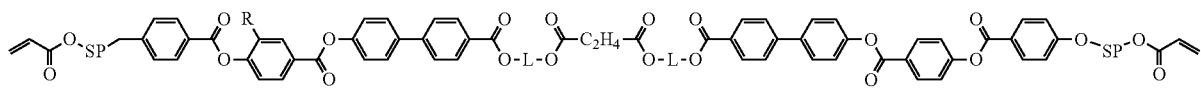

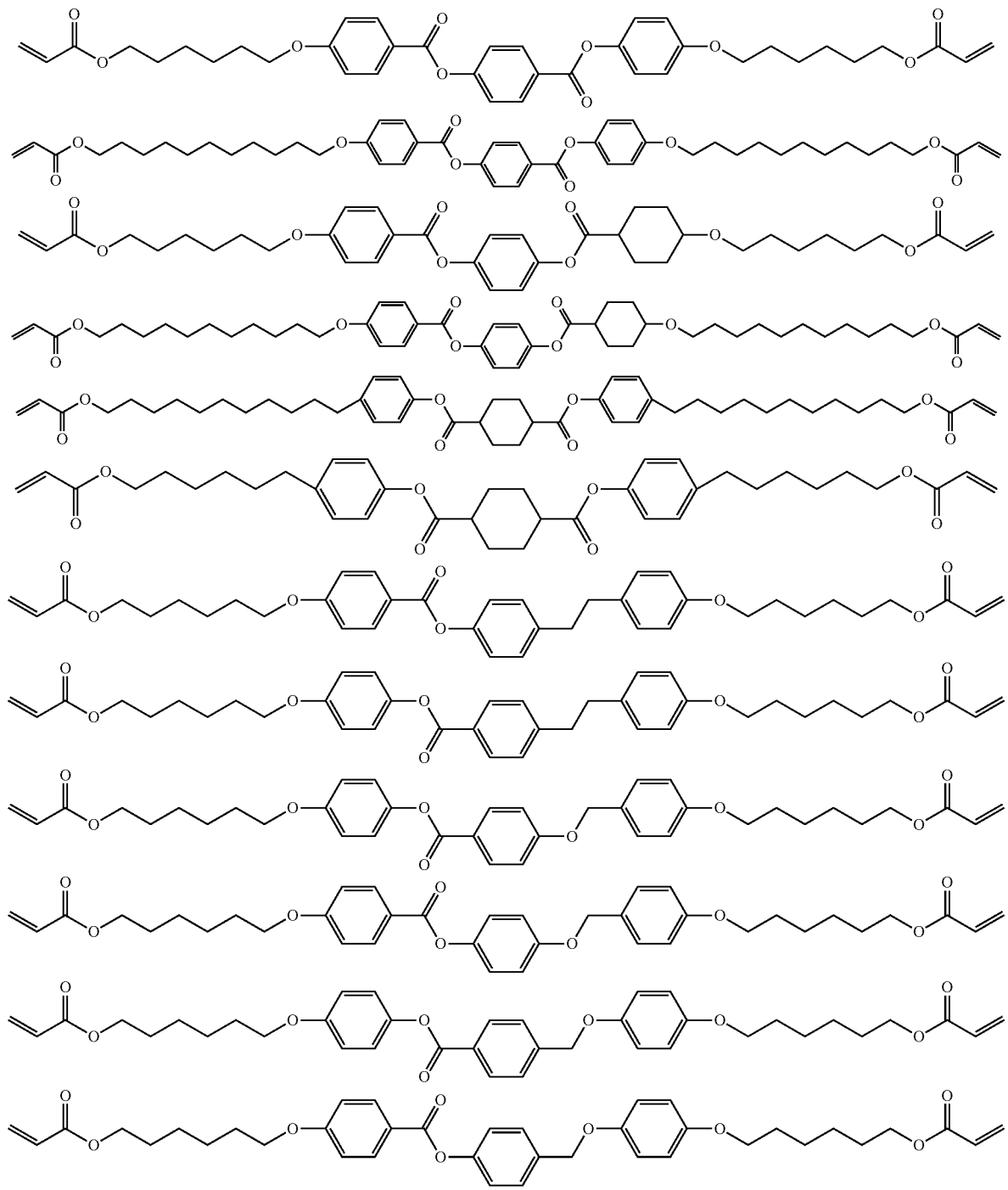

A content of the smectic liquid crystalline compound is preferably 50% to 99% by mass and more preferably 60% to 95% by mass with respect to the total solid content mass of the liquid crystal composition.

Dichroic Substance

The liquid crystal composition further contains a dichroic substance.

In the present invention, the dichroic substance means a coloring agent having different absorbances depending on directions. The dichroic substance may or may not exhibit liquid crystallinity.

The dichroic substance is not particularly limited, and examples thereof include a visible light absorbing material (dichroic coloring agent), a light emitting material (such as a fluorescent material or a phosphorescent material), an ultraviolet absorbing material, an infrared absorbing material, a non-linear optical material, a carbon nanotube, and an inorganic material (for example, a quantum rod). In addition, known dichroic substances (dichroic coloring agents) of the related art can be used.

Specific examples thereof include those described in paragraphs [0067] to [0071] of JP2013-228706A, paragraphs [0008] to [0026] of JP2013-227532A, paragraphs

[0008] to [0015] of JP2013-209367A, paragraphs [0045] to [0058] of JP2013-14883A, paragraphs [0012] to [0029] of JP2013-109090A, paragraphs [0009] to [0017] of JP2013-101328A, paragraphs [0051] to [0065] of JP2013-37353A, paragraphs [0049] to [0073] of JP2012-63387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502A, paragraphs [0014] to [0032] of JP2018-053167A, paragraphs [0014] to [0033] of JP2020-11716A, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, paragraphs [0014] to [0034] of WO2018/164252A, paragraphs [0021] to [0030] of WO2018/186503A, paragraphs [0043] to [0063] of WO2019/189345A, paragraphs [0043] to [0085] of WO2019/225468A, paragraphs [0050] to [0074] of WO2020/004106A, and paragraphs [0015] to [0038] of WO2021/044843A.

As a technique of aligning the dichroic substance in a desired direction, a technique of producing a polarizer formed of the dichroic substance or a technique of producing a guest-host liquid crystal cell can be referred to.

For example, techniques used in the method of producing a dichroic polarizer described in JP1999-305036A (JP-H11-305036A) or JP2002-90526A and the method of producing a guest-host type liquid crystal display device described in JP2002-99388A or JP2016-27387A can be used for production of the light absorption anisotropic layer according to the embodiment of the present invention.

Specifically, in a case of using the technique of the guest-host type liquid crystal cell, the light absorption anisotropic layer according to the embodiment of the present invention can be produced by mixing a dichroic substance serving as a guest and a rod-like liquid crystal compound serving as a host liquid crystal, aligning the host liquid crystal, aligning molecules of the dichroic substance along the alignment of the liquid crystal molecules, and fixing the alignment state.

In order to prevent fluctuation of light absorption characteristics of the light absorption anisotropic layer according to the embodiment of the present invention depending on the use environment, it is preferable that the alignment of the dichroic substance is fixed by forming a chemical bond. For example, the alignment can be fixed by promoting the polymerization of the host liquid crystal, the dichroic substance, and the polymerizable component to be added as desired.

In the present invention, two or more kinds of dichroic substances may be used in combination, and it is preferable to use three or more kinds of dichroic substances in combination.

In a case where two or more kinds of dichroic substances are used in combination, for example, from the reason that the contrast is higher and it is possible to further suppress the hue change of an image reflected by surroundings relative to an original image in a case of being used in a viewing angle control system, it is preferable that at least one dichroic substance having a maximal absorption wavelength in a wavelength range of 370 to 550 nm and at least one dichroic substance having a maximal absorption wavelength in a wavelength range of 500 to 700 nm are used in combination.

In addition, in a case where three or more kinds of dichroic substances are used in combination, from the same reason as described above, it is more preferable that at least one dichroic substance having a maximal absorption wavelength in a wavelength range of 560 nm or more and 700 nm or less, at least one dichroic substance having a maximal absorption wavelength in a wavelength range of 455 nm or more and less than 560 nm, and at least one dichroic substance having a maximal absorption wavelength in a wavelength range of 370 nm or more and less than 455 nm are used in combination.

Here, examples of the at least one dichroic substance having a maximal absorption wavelength in a wavelength range of 560 nm or more and 700 nm or less include a compound represented by Formula (1), which is described after paragraph [0043] of WO2019/189345A, and examples of the at least one dichroic substance having a maximal absorption wavelength in a wavelength range of 455 nm or more and less than 560 nm include a compound represented by Formula (2), which is described after paragraph [0054] of WO2019/189345A.

As described above, the content of the dichroic substance is 5.0% by mass or more with respect to the total solid content mass of the liquid crystal composition, but from the reason that it is possible to further suppress the hue change of an image reflected by surroundings relative to an original image in a case of being used in a viewing angle control system, the content thereof is preferably 8.0% by mass or more, more preferably 10.0% by mass or more, and still more preferably 10% to 50% by mass with respect to the total solid content mass of the liquid crystal composition. In a case where a plurality of dichroic substances are used in combination, it is preferable that the total amount of the plurality of dichroic substances is within the above-described range.

In addition, from the reason that the contrast is higher, the content of the dichroic substance is preferably 2 to 100 parts by mass and more preferably 4 to 50 parts by mass with respect to 1 part by mass of the alignment agent described below.

Alignment Agent

The liquid crystal composition further contains an alignment agent.

Examples of the alignment agent include those described in paragraphs [0042] to [0076] of JP2013-543526A, paragraphs [0089] to [0097] of JP2016-523997A, paragraphs [0153] to [0170] of JP2020-076920A, and the like, and these may be used alone or in combination of two or more.

In the present invention, from the reason that the contrast is higher, it is preferable that the above-described alignment agent is an onium compound represented by Formula (B1).

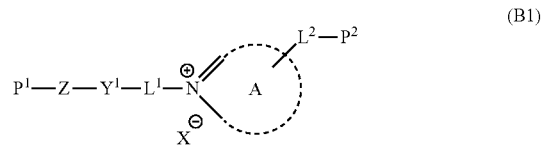

In Formula (B1), a ring A represents a quaternary ammonium ion consisting of a nitrogen-containing heterocyclic ring.

In addition, X represents an anion.

In addition, $L^1$ represents a divalent linking group.

In addition, $L^2$ represents a single bond or a divalent linking group.

In addition, $Y^1$ represents a divalent linking group having a 5-membered ring or a 6-membered ring as a partial structure.

In addition, Z represents a divalent linking group having an alkylene group having 2 to 20 carbon atoms as a partial structure.

In addition, $P^1$ and $P^2$ each independently represent a monovalent substituent having a polymerizable ethylenically unsaturated bond.

The ring A represents a quaternary ammonium ion consisting of a nitrogen-containing heterocyclic ring. Examples of the ring A include a pyridine ring, a picoline ring, a 2,2'-bipyridyl ring, a 4,4'-bipyridyl ring, a 1,10-phenanthroline ring, a quinoline ring, an oxazole ring, a thiazole ring, an imidazole ring, a pyrazine ring, a triazole ring, and a tetrazole ring, and the ring A is preferably a quaternary imidazolium ion or a quaternary pyridinium ion.

X represents an anion. Examples of X include a halogen anion (for example, a fluorine ion, a chlorine ion, a bromine ion, an iodine ion, and the like), a sulfonate ion (for example, a methanesulfonate ion, a trifluoromethanesulfonate ion, a methylsulfate ion, a vinylsulfonate ion, an allylsulfonate ion, a p-toluenesulfonate ion, a p-chlorobenzenesulfonate ion, a p-vinylbenzenesulfonate ion, a 1,3-benzenedisulfonate ion, a 1,5-naphthalenedisulfonate ion, a 2,6-naphthalenedisulfonate ion, and the like), a sulfate ion, a carbonate ion, a nitrate ion, a thiocyanate ion, a perchlorate ion, a tetrafluoroborate ion, a picrate ion, an acetate ion, a benzoate ion, a p-vinyl benzoate ion, a formate ion, a trifluoroacetate ion, a phosphate ion (for example, hexafluorophosphate ion), and a hydroxide ion. X is preferably a halogen anion, a sulfonate ion, or a hydroxide ion. In addition, a chlorine ion, a bromine ion, an iodine ion, a methanesulfonate ion, a vinylsulfonate ion, a p-toluenesulfonate ion, or a p-vinylbenzenesulfonate ion is particularly preferable.

$L^1$ represents a divalent linking group. Examples of $L^1$ include a divalent linking group having 1 to 20 carbon atoms, consisting of a combination of an alkylene group, —O—, —S—, —CO—, —SO$_2$—, —NRa- (here, Ra is an alkyl group having 1 to 5 carbon atoms or a hydrogen atom), an alkenylene group, an alkynylene group, and an arylene group. $L^1$ is preferably -AL-, —O-AL-, —CO—O-AL-, or —O—CO-AL-, each of which has 1 to 10 carbon atoms, more preferably -AL- or —O-AL-, each of which has 1 to 10 carbon atoms, and most preferably -AL- or —O-AL-, each of which has 1 to 5 carbon atoms. AL represents an alkylene group.

$L^2$ represents a single bond or a divalent linking group. Examples of $L^2$ include a divalent linking group having 1 to 10 carbon atoms, consisting of a combination of an alkylene group, —O—, —S—, —CO—, —SO$_2$—, —NRa- (here, Ra is an alkyl group having 1 to 5 carbon atoms or a hydrogen atom), an alkenylene group, an alkynylene group, and an arylene group; a single bond, —O—, —O—CO—, —CO—O—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO—, and —O—CO-AL-CO—O—. AL represents an alkylene group. $L^2$ is preferably a single bond, -AL-, —O-AL-, or —NRa-AL-O—, each of which has 1 to 10 carbon atoms, more preferably a single bond, -AL-, —O-AL-, or —NRa-AL-O—, each of which has 1 to 5 carbon atoms, and most preferably a single bond, —O-AL-, or —NRa-AL-O—, each of which has 1 to 5 carbon atoms.

$Y^1$ represents a divalent linking group having a 5- or 6-membered ring as a partial structure. Examples of $Y^1$ include a cyclohexyl ring, an aromatic ring, or a heterocyclic ring. Examples of the aromatic ring include a benzene ring, an indene ring, a naphthalene ring, a fluorene ring, a phenanthrene ring, an anthracene ring, a biphenyl ring, and a pyrene ring, and a benzene ring, a biphenyl ring, or a naphthalene ring is particularly preferable. As a heteroatom constituting the heterocyclic ring, a nitrogen atom, an oxygen atom, or a sulfur atom is preferable, and examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a dioxane ring, a dithiane ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring. The heterocyclic ring is preferably a 6-membered ring. The divalent linking group represented by $Y^1$, having a 5- or 6-membered ring as a partial structure, may further have a substituent (for example, the above-described substituent W).

The divalent linking group represented by $Y^1$ is preferably a divalent linking group having two or more 5- or 6-membered rings, and more preferably has a structure in which two or more rings are linked to each other through a linking group. Examples of the linking group include the examples of the linking group represented by $L^1$ and $L^2$, —C≡C—, —CH═CH—, —CH═N—, —N═CH—, and —N═N—.

Z represents a divalent linking group which has an alkylene group having 2 to 20 carbon atoms as a partial structure and consists of a combination of —O—, —S—, —CO—, and —SO$_2$—, in which the alkylene group may have a substituent. Examples of the above-described divalent linking group include an alkyleneoxy group and a polyalkyleneoxy group. The number of carbon atoms in the alkylene group represented by Z is more preferably 2 to 16, still more preferably 2 to 12, and particularly preferably 2 to 8.

$P^1$ and $P^2$ each independently represent a monovalent substituent having a polymerizable ethylenically unsaturated group. Examples of the above-described monovalent substituent having a polymerizable ethylenically unsaturated group include Formulae (M-1) to (M-8). That is, the monovalent substituent having a polymerizable ethylenically unsaturated group may be a substituent consisting of only an ethenyl group as in Formula (M-8).

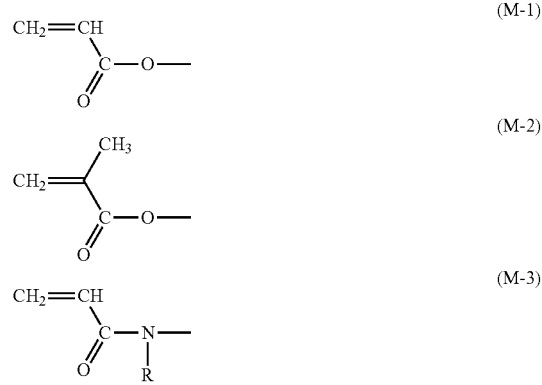

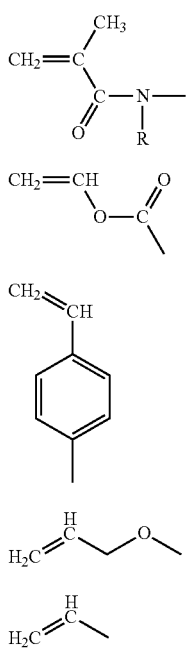

(M-4)

(M-5)

(M-6)

(M-7)

(M-8)

In Formulae (M-3) and (M-4), R represents a hydrogen atom or an alkyl group, and a hydrogen atom or a methyl group is preferable. Among Formulae (M-1) to (M-8), (M-1), (M-2), or (M-8) is preferable, and (M-1) or (M-8) is more preferable. In particular, $P^1$ is preferably (M-1). In addition, $P^2$ is preferably (M-1) or (M-8), and in a compound in which the ring A is quaternary imidazolium ion, $P^2$ is preferably (M-8) or (M-1), and in a compound in which the ring A is a quaternary pyridinium ion, $P^2$ is preferably (M-1).

Examples of the onium compound represented by Formula (B1) include onium salts described in paragraphs 0052 to 0058 of JP2012-208397A, onium salts described in paragraphs 0024 to 0055 of JP2008-026730A, and onium salts described in JP2002-37777A.

In the present invention, from the reason that the contrast is higher, it is preferable that the above-described alignment agent is a boronic acid compound represented by Formula (B2).

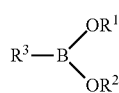

(B2)

In (B2), $R^1$ and $R^2$ each independently represent a hydrogen atom, an aliphatic hydrocarbon group which may have a substituent, an aryl group which may have a substituent, or a heterocyclic group which may have a substituent.

In addition, $R^3$ represents a substituent.

Examples of the aliphatic hydrocarbon group represented by one aspect of $R^1$ and $R^2$ include a linear or branched alkyl group having 1 to 20 carbon atoms, which may be substituted or unsubstituted, (for example, a methyl group, an ethyl group, an iso-propyl group, and the like), a substituted or unsubstituted cyclic alkyl group having 3 to 20 carbon atoms (for example, a cyclohexyl group and the like), and an alkenyl group having 2 to 20 carbon atoms (for example, a vinyl group and the like).

In addition, examples of the aryl group represented by one aspect of $R^1$ and $R^2$ include a substituted or unsubstituted phenyl group having 6 to 20 carbon atoms (for example, a phenyl group, a tolyl group, and the like), and a substituted or unsubstituted naphthyl group having 10 to 20 carbon atoms.

In addition, examples of the heterocyclic group represented by one aspect of $R^1$ and $R^2$ include a substituted or unsubstituted 5-membered or 6-membered ring group including at least one heteroatom (for example, a nitrogen atom, an oxygen atom, a sulfur atom, and the like), and specific examples thereof include a pyridyl group, an imidazolyl group, a furyl group, a piperidyl group, and a morpholino group.

$R^1$ and $R^2$ may be linked to each other to form a ring. For example, isopropyl groups of $R^1$ and $R^2$ may be linked to each other to form a 4,4,5,5-tetramethyl-1,3,2-dioxaborolane ring.

As $R^1$ and $R^2$, a hydrogen atom, a linear or branched alkyl group having 1 to 3 carbon atoms, or an aspect in which these groups are linked to each other to form a ring is preferable, and a hydrogen atom is more preferable.

As the substituent represented by $R^3$, a substituent including a functional group which can be bonded to a (meth) acrylic group is preferable.

Here, examples of the functional group which can be bonded to a (meth)acrylic group include a vinyl group, an acrylate group, a methacrylate group, an acrylamide group, a styryl group, a vinyl ketone group, a butadiene group, a vinyl ether group, an oxiranyl group, an aziridinyl group, and an oxetane group. Among these, a vinyl group, an acrylate group, a methacrylate group, a styryl group, an oxiranyl group, or an oxetane group is preferable, and a vinyl group, an acrylate group, an acrylamide group, or a styryl group is more preferable.

$R^3$ is preferably a substituted or unsubstituted aliphatic hydrocarbon group, aryl group, or heterocyclic group having the functional group which can be bonded to a (meth)acrylic group.

Examples of the aliphatic hydrocarbon group include a substituted or unsubstituted linear or branched alkyl group having 1 to 30 carbon atoms (for example, a methyl group, an ethyl group, an iso-propyl group, an n-propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, an sec-butyl group, a tert-butyl group, an isopentyl group, a neopentyl group, a 1-methylbutyl group, an isohexyl group, a 2-methylhexyl group, and the like), a substituted or unsubstituted cyclic alkyl group having 3 to 20 carbon atoms (for example, a cyclopentyl group, a cyclohexyl group, a 1-adamantyl group, a 2-norbornyl group, and the like), and an alkenyl group having 2 to 20 carbon atoms (for example, a vinyl group, a 1-propenyl group, a 1-butenyl group, a 1-methyl-1-propenyl group, and the like).

Examples of the aryl group include a substituted or unsubstituted phenyl group having 6 to 50 carbon atoms (for example, a phenyl group, a tolyl group, a styryl group, a 4-benzoyloxyphenyl group, a 4-phenoxycarbonylphenyl group, a 4-biphenyl group, a 4-(4-octyloxybenzoyloxy)phenoxycarbonylphenyl group, and the like), and a substituted or unsubstituted naphthyl group having 10 to 50 carbon atoms (for example, an unsubstituted naphthyl group and the like).

The heterocyclic group is, for example, a substituted or unsubstituted 5-membered or 6-membered ring group including at least one heteroatom (for example, a nitrogen atom, an oxygen atom, a sulfur atom, and the like), and examples thereof include groups of pyrrole, furan, thiophene, pyrazole, imidazole, triazole, oxazole, isoxazole, oxadiazole, thiazole, thiadiazole, indole, carbazole, benzofuran, dibenzofuran, thianaphthene, dibenzothiophene, indazole benzimidazole, anthranil, benzisoxazole, benzoxazole, benzothiazole, purine, pyridine, pyridazine, pyrimidine, pyrazine, triazine, quinoline, acridine, isoquinoline, phthalazine, quinazoline, quinoxaline, naphthyridine, phenanthroline, pteridine, morpholine, piperidine, and the like.

Examples of the boronic acid compound represented by Formula (B2) include a boronic acid compound represented by General Formula (I) described in paragraphs 0023 to 0032 of JP2008-225281A.

As the compound represented by Formula (B2), compounds exemplified below are also preferable.

ketone, cyclopentanone, cyclohexanone, and acetylacetone), ethers (such as dioxane, tetrahydrofuran, tetrahydropyran, dioxolane, tetrahydrofurfuryl alcohol, cyclopentyl methyl ether, and dibutyl ether), aliphatic hydrocarbons (such as hexane), alicyclic hydrocarbons (such as cyclohexane), aromatic hydrocarbons (such as benzene, toluene, xylene, tetralin, and trimethylbenzene), halogenated carbons (such as dichloromethane, trichloromethane (chloroform), dichloroethane, dichlorobenzene, 1,1,2,2-tetrachloroethane, and chlorotoluene), esters (such as methyl acetate, ethyl acetate, butyl acetate, diethyl carbonate, ethyl acetoacetate, n-pentyl acetate, ethyl benzoate, benzyl benzoate, butyl carbitol acetate, diethylene glycol monoethyl ether acetate, and isoamyl acetate), alcohols (such as ethanol, isopropanol, butanol, cyclohexanol, furfuryl alcohol, 2-ethylhexanol, octanol, benzyl alcohol, ethanolamine, ethylene glycol, propylene glycol, diethylene glycol, diethylene glycol monomethyl ether, diethylene glycol monoethyl ether, and diethylene glycol monobutyl ether), phenols (such as phenol and

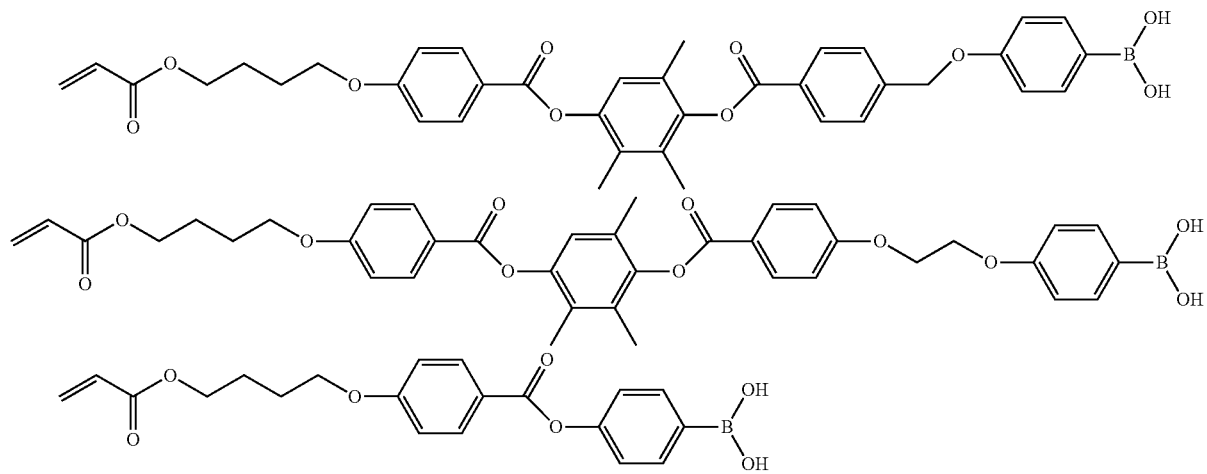

40

In addition to the compound represented by Formula (B1) or (B2), examples of the above-described alignment agent include at least one compound selected from the group consisting of a nonionic silane compound and an ionic compound.

Here, the above-described ionic compound does not include the compound represented by Formula (B1).

Examples of the nonionic silane compound include compounds described in paragraphs [0035] to [0039] of JP2020-181150A.

In addition, examples of the ionic compound include compounds described in paragraphs [0017] to [0029] of JP2020-181150A.

A content of the above-described alignment agent is preferably 0.1 to 10 parts by mass and more preferably 0.2 to 8 parts by mass with respect to the total of 100 parts by mass of the liquid crystalline compound and the dichroic substance contained in the liquid crystal composition.

Solvent

From the viewpoint of workability and the like, it is preferable that the liquid crystal composition contains a solvent.

Examples of the solvent include organic solvents such as ketones (such as acetone, 2-butanone, methyl isobutyl cresol), cellosolves (such as methyl cellosolve, ethyl cellosolve, and 1,2-dimethoxyethane), cellosolve acetates, sulfoxides (such as dimethyl sulfoxide), amides (such as dimethylformamide, dimethylacetamide, N-methylpyrrolidone, N-ethylpyrrolidone, and 1,3-dimethyl-2-imidazolidinone), and heterocyclic compounds (such as pyridine and 2,6-lutidine); and water.

These solvents may be used alone or in combination of two or more kinds thereof.

In a case where the liquid crystal composition contains a solvent, a content of the solvent is preferably 60% to 99.5% by mass, more preferably 70% to 99% by mass, and particularly preferably 75% to 98% by mass with respect to the total mass (100% by mass) of the liquid crystal composition.

Polymerization Initiator

The liquid crystal composition may contain a polymerization initiator.

The polymerization initiator is not particularly limited, but a compound having photosensitivity, that is, a photopolymerization initiator is preferable.

As the photopolymerization initiator, various compounds can be used without any particular limitation. Examples of the photopolymerization initiator include α-carbonyl compounds (U.S. Pat. Nos. 2,367,661A and 2,367,670A), acyloin ether (U.S. Pat. No. 2,448,828A), α-hydrocarbon-substituted aromatic acyloin compounds (U.S. Pat. No. 2,722,512A), polynuclear quinone compounds (U.S. Pat. Nos. 3,046,127A and 2,951,758A), a combination of a triarylimidazole dimer and a p-aminophenyl ketone (U.S. Pat. No. 3,549,367A), acridine and phenazine compounds (JP1985-105667A (JP-S60-105667A) and U.S. Pat. No. 4,239,850A), oxadiazole compounds (U.S. Pat. No. 4,212,970A), o-acyloxime compounds ([0065] of JP2016-27384A), and acylphosphine oxide compounds (JP1988-40799B (JP-S63-40799B), JP1993-29234B (JP-H5-29234B), JP1998-95788A (JP-H10-95788A), and JP1998-29997A (JP-H10-29997A)).

Commercially available products can also be used as such a photopolymerization initiator, and examples thereof include IRGACURE-184, IRGACURE-907, IRGACURE-369, IRGACURE-651, IRGACURE-819, IRGACURE-OXE-01, and IRGACURE-OXE-02, manufactured by BASF SE.

In a case where the liquid crystal composition contains a polymerization initiator, a content of the polymerization initiator is preferably 0.01% to 30% by mass and more preferably 0.1% to 15% by mass with respect to the total solid content mass of the liquid crystal composition.

Polymerizable Compound

The liquid crystal composition may contain a polymerizable compound.

Examples of the polymerizable compound include a compound including an acrylate (such as a (meth)acrylate monomer).

In a case where the liquid crystal composition contains a polymerizable compound, a content of the polymerizable compound is preferably 0.5% to 50% by mass and more preferably 1.0% to 40% by mass with respect to the total solid content mass of the liquid crystal composition.

Interface Improver

The liquid crystal composition may contain an interface improver.

The interface improver is not particularly limited, and a polymer-based interface improver or a low-molecular-weight interface improver can be used, and compounds described in paragraphs [0253] to [0293] of JP2011-237513A can also be used.

In addition, fluorine (meth)acrylate-based polymers described in paragraphs [0018] to [0043] of JP2007-272185A can also be used as the interface improver.

In addition, examples of the interface improver include compound described in paragraphs [0079] to [0102] of JP2007-069471A, polymerizable liquid crystalline compounds represented by Formula (4) described in JP2013-047204A (particularly, compounds described in paragraphs [0020] to [0032]), polymerizable liquid crystalline compounds represented by Formula (4) described in JP2012-211306A (particularly, compounds described in paragraphs [0022] to [0029]), liquid crystal alignment promoters represented by Formula (4) described in JP2002-129162A (particularly, compounds described in paragraphs [0076] to [0078] and paragraphs [0082] to [0084]), compounds represented by Formulae (4), (II), and (III) described in JP2005-099248A (particularly, compounds described in paragraphs [0092] to [0096]), compounds described in paragraphs [0013] to [0059] of JP4385997B, compounds described in paragraphs [0018] to [0044] of JP5034200B, and compounds described in paragraphs [0019] to [0038] of JP4895088B.

The interface improvers may be used alone or in combination of two or more kinds thereof.

In a case where the liquid crystal composition contains an interface improver, a content of the interface improver is preferably 0.005% to 15% by mass, more preferably 0.01% to 5% by mass, and still more preferably 0.015% to 3% by mass with respect to the total solid content mass of the liquid crystal composition. In a case where a plurality of interface improvers are used in combination, it is preferable that the total amount of the plurality of interface improvers is within the above-described range.

Method for Forming Light Absorption Anisotropic Layer

A method of forming the light absorption anisotropic layer according to the embodiment of the present invention is not particularly limited, and examples thereof include a method including, in the following order, a step of applying the above-described liquid crystal composition (hereinafter, also referred to as "composition for forming a light absorption anisotropic layer") to form a coating film (hereinafter, also referred to as "coating film forming step") and a step of aligning a liquid crystalline component or a dichroic substance contained in the coating film (hereinafter, also referred to as "alignment step").

In a case where the above-described dichroic substance has liquid crystallinity, the liquid crystalline component is a component which also includes the dichroic substance having liquid crystallinity in addition to the above-described liquid crystalline compound.

Coating Film Forming Step

The coating film forming step is a step of applying the composition for forming a light absorption anisotropic layer to form a coating film.

The composition for forming a light absorption anisotropic layer can be easily applied by using a composition for forming a light absorption anisotropic layer, which contains the above-described solvent, or using a liquid such as a melt obtained by heating the composition for forming a light absorption anisotropic layer.

Specific examples of a method of applying the composition for forming a light absorption anisotropic layer include known methods such as a roll coating method, a gravure printing method, a spin coating method, a wire bar coating method, an extrusion coating method, a direct gravure coating method, a reverse gravure coating method, a die coating method, a spraying method, and an ink jet method.

Alignment Step

The alignment step is a step of aligning a liquid crystalline component contained in the coating film. In this manner, the light absorption anisotropic layer is obtained.

The alignment step may include a drying treatment. Components such as a solvent can be removed from the coating film by performing the drying treatment. The drying treatment may be performed by a method of allowing the coating film to stand at room temperature for a predetermined time (for example, natural drying) or a method of heating the coating film and/or blowing air to the coating film.

Here, the liquid crystalline component contained in the composition for forming a light absorption anisotropic layer may be aligned by the coating film forming step or the drying treatment described above. For example, in an aspect in which the composition for forming a light absorption anisotropic layer is prepared as a coating liquid containing a solvent, a coating film having light absorption anisotropy (that is, a light absorption anisotropic layer) is obtained by drying the coating film and removing the solvent from the coating film.

In a case where the drying treatment is performed at a temperature higher than or equal to a transition temperature of the liquid crystalline component contained in the coating film to the liquid crystal phase, a heat treatment described below may not be performed.

From the viewpoint of manufacturing suitability or the like, the transition temperature of the liquid crystalline component contained in the coating film to the liquid crystal phase is preferably 10° C. to 250° C. and more preferably 25° C. to 190° C. In a case where the above-described transition temperature is 10° C. or higher, a cooling treatment or the like for lowering the temperature to a temperature range in which the liquid crystal phase is exhibited is not necessary, which is preferable. In addition, in a case where the above-described transition temperature is 250° C. or lower, a high temperature is not required even in a case of setting an isotropic liquid state at a temperature higher than the temperature range in which the liquid crystal phase is temporarily exhibited, and waste of thermal energy and deformation and deterioration of a substrate can be reduced, which is preferable.

It is preferable that the alignment step includes a heat treatment. In this manner, since the liquid crystalline component contained in the coating film can be aligned, the coating film after being subjected to the heat treatment can be suitably used as the light absorption anisotropic layer.

From the viewpoint of the manufacturing suitability or the like, the heat treatment is performed at a temperature of preferably 10° C. to 250° C. and more preferably 25° C. to 190° C. In addition, the heating time is preferably 1 to 300 seconds and more preferably 1 to 60 seconds.

The alignment step may include a cooling treatment performed after the heat treatment. The cooling treatment is a treatment of cooling the heated coating film to room temperature (20° C. to 25° C.). In this manner, the alignment of the liquid crystalline component contained in the coating film can be fixed. A cooling unit is not particularly limited, and the cooling treatment can be performed according to a known method.

The light absorption anisotropic layer can be obtained by performing the above-described steps.

In the present embodiment, examples of a method of aligning the liquid crystalline component contained in the coating film include the drying treatment and the heat treatment, but the present invention is not limited thereto, and the liquid crystalline component can be aligned by a known alignment treatment.

Other Steps

The method of forming the light absorption anisotropic layer may include a step of curing the light absorption anisotropic layer after the alignment step (hereinafter, also referred to as "curing step").

The curing step is performed by heating the light absorption anisotropic layer and/or irradiating the light absorption anisotropic layer with light (exposing the light absorption anisotropic layer to light), for example, in a case where the light absorption anisotropic layer has a crosslinkable group (polymerizable group). Among these, it is preferable that the curing step is performed by irradiating the light absorption anisotropic layer with light.

Various light sources such as infrared rays, visible light, and ultraviolet rays can be used as a light source for curing, but ultraviolet rays are preferable. In addition, ultraviolet rays may be applied while the layer is heated during curing, or ultraviolet rays may be applied through a filter which transmits only a specific wavelength.

In a case where the exposure is performed while the layer is heated, the heating temperature during the exposure depends on the transition temperature of the liquid crystalline component contained in the liquid crystal film to the liquid crystal phase, but it is preferably 25° C. to 140° C.

In addition, the exposure may be performed under a nitrogen atmosphere. In a case where the curing of the liquid crystal film proceeds by radical polymerization, since inhibition of polymerization by oxygen is reduced, it is preferable that the exposure is performed in a nitrogen atmosphere.

From the reason that it is possible to suppress the hue change of an image reflected by surroundings relative to an original image, a thickness of the light absorption anisotropic layer according to the embodiment of the present invention is preferably 1.5 µm or more, and preferably 4.0 µm or less.

Patterning of Light Absorption Anisotropic Layer

The light absorption anisotropic layer according to the embodiment of the present invention can be a light absorption anisotropic layer which has a region A and a region B in the plane and has different transmittance central axes in each region. In a case where light emitting pixels are controlled by patterning each liquid crystal pixel, the center of the visual field in a narrow visual field can be switched.

Further, the light absorption anisotropic layer according to the embodiment of the present invention can be a light absorption anisotropic layer which has a region C and a region D in the plane and has different transmittances at an angle inclined by 30° with respect to the normal direction from the transmittance central axis in the plane provided with the transmittance central axis and the normal line of the surface of the light absorption anisotropic layer in the region C and the region D. In this case, it is preferable that the light absorption anisotropic layer is a light absorption anisotropic layer in which the transmittance at an angle inclined by 30° with respect to the normal direction from the transmittance central axis of the region C is 50% or less and the transmittance at an angle inclined by 30° with respect to the normal direction from the transmittance central axis of the region D is 80% or more.

Viewing angle dependence in some regions can be strengthened or weakened by performing the above-described patterning. In this manner, highly confidential information can also be displayed only in the region where the viewing angle dependence is strengthened. In addition, design with excellent designability can be carried out by controlling the viewing angle dependence as a display device for each display position. Furthermore, in a case where the light emitting pixels are controlled by performing patterning for each pixel of the liquid crystal, it is possible to switch between a narrow viewing angle and a wide viewing angle.

Pattern Forming Method

A method of forming the patterned light absorption anisotropic layer having two or more regions different in the plane is not limited, and various known methods as described in, for example, WO2019/176918A can be used. Examples thereof include a method of forming a pattern by changing an irradiation angle of ultraviolet light to be applied to a photo-alignment film, a method of controlling a thickness of the patterned light absorption anisotropic layer in the plane, a method of unevenly distributing a dichroic coloring agent compound in the patterned light absorption anisotropic layer, and a method of post-processing an optically uniform patterned light absorption anisotropic layer.

Examples of the method of controlling the thickness of the patterned light absorption anisotropic layer in the plane include a method of using lithography, a method of using imprinting, and a method of forming a patterned light absorption anisotropic layer on a base material having an uneven structure. Examples of the method of unevenly distributing a dichroic coloring agent compound in the patterned light absorption anisotropic layer include a method of extracting a dichroic coloring agent by solvent immersion (bleaching). In addition, examples of the method of post-processing an optically uniform patterned light absorption anisotropic layer include a method of cutting a part of a flat light absorption anisotropic layer by laser processing or the like.

Optical Film

The optical film according to the embodiment of the present invention includes a transparent film base material and the above-described light absorption anisotropic layer according to the embodiment of the present invention, which is provided on the transparent film base material.

Hereinafter, each member constituting the optical film according to the embodiment of the present invention will be described.

Transparent Film Base Material

As the transparent film base material, a known transparent resin film such as a transparent resin plate, a transparent resin sheet, or the like can be used without particular limitation. As the transparent resin film, a cellulose acylate film (such as a cellulose triacetate film (refractive index: 1.48), a cellulose diacetate film, a cellulose acetate butyrate film, and a cellulose acetate propionate film), a polyethylene terephthalate film, a polyether sulfone film, a polyacrylic resin film, a polyurethane-based resin film, a polyester film, a polycarbonate film, a polysulfone film, a polyether film, a polymethylpentene film, a polyetherketone film, a (meth) acrylonitrile film, or the like can be used.

Among these, a cellulose acylate film which is highly transparent, has a small optical birefringence, is easily produced, and is typically used as a protective film of a polarizing plate is preferable, and a cellulose triacetate (also referred to as triacetyl cellulose (TAC)) film is particularly preferable.

A thickness of the transparent film base material is typically 20 μm to 100 μm.

In the present invention, it is particularly preferable that the transparent film base material is a cellulose ester-based film having a thickness 20 to 70 μm.

Light Absorption Anisotropic Layer

Since the light absorption anisotropic layer included in the optical film according to the embodiment of the present invention is the above-described light absorption anisotropic layer according to the embodiment of the present invention, the description thereof will not be repeated.

Alignment Film

It is preferable that the optical film according to the embodiment of the present invention includes an alignment film between the transparent film base material and the light absorption anisotropic layer.

The alignment film is preferably an alignment film consisting of polyvinyl alcohol or polyimide.

The alignment film can refer to the description on page 43, line 24 to page 49, line 8 of WO2001/88574A1.

A thickness of the alignment film is preferably 0.01 to 10 μm and more preferably 0.01 to 1 μm.

Barrier Layer

It is preferable that the optical film according to the embodiment of the present invention includes a barrier layer together with the transparent film base material and the light absorption anisotropic layer.

Here, the barrier layer is also referred to as a gas-shielding layer (oxygen-shielding layer), and has a function of protecting the polarizer of the present invention from gas such as oxygen in the atmosphere, the moisture, or the compound contained in an adjacent layer.

The barrier layer can refer to, for example, the description in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, and paragraphs [0021] to of [0031] JP2005-169994A.

Refractive Index Adjusting Layer

From the viewpoint of suppressing influence of internal reflection caused by the high refractive index of the light absorption anisotropic layer, the optical film according to the embodiment of the present invention preferably includes a refractive index adjusting layer.

The refractive index adjusting layer is a layer disposed in contact with the light absorption anisotropic layer, and has an in-plane average refractive index of 1.55 or more and 1.70 or less at a wavelength of 550 nm. It is preferable that the refractive index adjusting layer is a refractive index adjusting layer for performing so-called index matching.

Viewing Angle Control System

The viewing angle control system according to the embodiment of the present invention includes a polarizer having an absorption axis in an in-plane direction, and the above-described light absorption anisotropic layer according to the embodiment of the present invention or the above-described optical film according to the embodiment of the present invention.

Polarizer

The polarizer included in the viewing angle control system according to the embodiment of the present invention is not particularly limited as long as the polarizer is a member having an absorption axis in the plane and having a function of converting light into specific linearly polarized light, and a known polarizer in the related art can be used.

As the polarizer, an iodine-based polarizer, a dye-based polarizer using a dichroic dye, a polyene-based polarizer, or the like is used. Examples of the iodine-based polarizer and the dye-based polarizer include a coating type polarizer and a stretching type polarizer, and both polarizers can be applied. As the coating type polarizer, a polarizer in which a dichroic organic coloring agent is aligned by using alignment of the liquid crystalline compound is preferable, and as the stretching type polarizer, a polarizer produced by adsorbing iodine or a dichroic dye on polyvinyl alcohol and stretching the polyvinyl alcohol is preferable.

In addition, examples of the method of obtaining a polarizer by stretching and dyeing a laminated film in which a polyvinyl alcohol layer is formed on a base material include methods described in JP5048120B, JP5143918B, JP4691205B, JP4751481B, and JP4751486B, and known techniques related to these polarizers can also be preferably used.

Among these, from the viewpoint of availability and excellent polarization degree, a polarizer containing a polyvinyl alcohol-based resin (a polymer having —$CH_2$—CHOH— as a repeating unit; particularly at least one selected from the group consisting of polyvinyl alcohol and an ethylene-vinyl alcohol copolymer) is preferable.

In the present invention, a thickness of the polarizer is not particularly limited, but is preferably 3 µm to 60 µm, more preferably 5 µm to 20 µm, and still more preferably 5 µm to 10 µm.

In the viewing angle control system according to the embodiment of the present invention, an angle φ between a direction φ1 in which a transmittance central axis of the light absorption anisotropic layer is orthographically projected onto a film surface and an absorption axis φ2 of the polarizer is preferably 45° to 90°, more preferably 80° to 90°, and still more preferably 88° to 90°. As the above-described angle is closer to 90°, the illuminance contrast between a direction in which an image display device is easily seen and a direction in which the image display device is not easily seen can be provided.

In the viewing angle control system according to the embodiment of the present invention, the above-described light absorption anisotropic layer and the above-described may be laminated through a pressure-sensitive adhesive layer or an adhesive layer described below, or the above-described alignment film and the above-described light absorption anisotropic layer may be directly applied and laminated onto the above-described polarizer.

Pressure-Sensitive Adhesive Layer

It is preferable that the pressure-sensitive adhesive layer is a transparent and optically isotropic adhesive similar to that used in a typical image display device, and a pressure sensitive type adhesive is typically used.

The pressure-sensitive adhesive layer may be blended with appropriate additives such as a crosslinking agent (such as an isocyanate-based crosslinking agent or an epoxy-based crosslinking agent), a viscosity imparting agent (such as a rosin derivative resin, a polyterpene resin, a petroleum resin, and an oil-soluble phenol resin), a plasticizer, a filler, an antiaging agent, a surfactant, an ultraviolet absorbing agent, a light stabilizer, and an antioxidant in addition to a parent material (pressure sensitive adhesive), conductive particles, and thermally expandable particles used as necessary.

A thickness of the pressure-sensitive adhesive layer is typically 20 to 500 µm, preferably 20 to 250 µm. Required adhesive strength or rework suitability may not be obtained in a case where the thickness thereof is less than 20 µm, and the pressure sensitive adhesive may protrude or bleed out from the peripheral end portion of the image display device in a case where the thickness thereof is more than 500 µm.

The pressure-sensitive adhesive layer can be formed by an appropriate method such as a method of directly coating a support for a protective member with a coating solution containing a parent material, conductive particles, and as necessary, thermally expandable particles, an additive, a solvent, and the like and pressure-bonding the support through a release liner or a method of coating an appropriate release liner (release paper or the like) with a coating solution to form a thermally expandable pressure-sensitive adhesive layer, and pressure-bonding and transferring (transporting) the layer onto the support for a protective member.

In addition, for example, a configuration in which conductive particles are added to a configuration of a thermally-releasable pressure-sensitive adhesive sheet described in JP2003-292916A can be employed as the protective member.

Furthermore, a member in which conductive particles are sprayed on the surface of a pressure-sensitive adhesive layer in commercially available products such as "REVALPHA" manufactured by Nitto Denko Corporation may be used as the protective member.

Adhesive Layer

The adhesive exhibits adhesiveness due to drying or a reaction after bonding.

A polyvinyl alcohol-based adhesive (PVA-based adhesive) exhibits adhesiveness due to drying, and is capable of bonding materials to each other.

Specific examples of the curable adhesive which exhibits adhesiveness due to reaction include an active energy ray-curable adhesive such as a (meth) acrylate-based adhesive and a cationic polymerization curable adhesive. The (meth) acrylate denotes acrylate and/or methacrylate. Examples of the curable component in the (meth)acrylate-based adhesive include a compound having a (meth)acryloyl group and a compound having a vinyl group. In addition, as the cationic polymerization curable adhesive, a compound having an epoxy group or an oxetanyl group can also be used. The compound having an epoxy group is not particularly limited as long as the compound has at least two epoxy groups in a molecule, and various generally known curable epoxy compounds can be used. Preferred examples of the epoxy compound include a compound (aromatic epoxy compound) having at least two epoxy groups and at least one aromatic ring in the molecule and a compound (alicyclic epoxy compound) having at least two epoxy groups in the molecule, in which at least one of the epoxy groups is formed between two adjacent carbon atoms constituting an alicyclic ring.

Among these, from the viewpoint of heat deformation resistance, an ultraviolet curable adhesive which is cured by irradiation with ultraviolet rays is preferably used.

Each of the adhesive layer and the pressure-sensitive adhesive layer may be obtained by imparting ultraviolet absorbing ability to the layer using a method of performing a treatment with an ultraviolet absorbing agent such as a salicylic acid ester-based compound, a benzophenol-based compound, a benzotriazole-based compound, a cyanoacrylate-based compound, or a nickel complex salt-based compound.

The pressure-sensitive adhesive layer and the adhesive layer can be attached by an appropriate method. For example, the pressure-sensitive adhesive layer or the adhesive layer may be attached to the film by a method of preparing 10% to 40% by weight of a pressure sensitive adhesive solution obtained by dissolving or dispersing a base polymer or a composition thereof in a solvent consisting of a single substance or a mixture of an appropriate solvent such as toluene or ethyl acetate and directly attaching the solution on the film using an appropriate development method such as a casting method or a coating method; or a method of forming a pressure-sensitive adhesive layer on a separator in conformity with the above-described method and transporting the layer.

The pressure-sensitive adhesive layer and the adhesive layer may be provided on one or both surfaces of the film as a layer obtained by superimposing different kinds of layers with different compositions. In addition, in a case where the layers are provided on both surfaces of the film, different kinds of pressure-sensitive adhesive layers with different compositions and different thicknesses can be provided on the front and rear surfaces of the film.

Other Layers

In the viewing angle control system according to the embodiment of the present invention, in order to control angle dependence of the viewing angle, the above-described light absorption anisotropic layer can also be used by being combined with an optically anisotropic film or an azimuth rotator. For example, as a transparent base film, a resin film having optical anisotropy, which consists of a polymer containing carbonate, cycloolefin, cellulose acylate, methyl methacrylate, styrene, a maleic acid anhydride, or the like, can also be preferably used.

Image Display Device

The image display device according to the embodiment of the present invention includes a display element and the above-described viewing angle control system according to the embodiment of the present invention, in which the viewing angle control system is disposed on at least one main surface of the display element.

In addition, in the image display device according to the embodiment of the present invention, it is preferable that the light absorption anisotropic layer included in the viewing angle control system is disposed on a viewing side with respect to the polarizer included in the viewing angle control system, that is, it is preferable that the image display device includes the light absorption anisotropic layer, the polarizer, and the display element in this order from the viewing side.

The display element used in the image display device according to the embodiment of the present invention is not particularly limited, and examples thereof include a liquid crystal cell, an organic electroluminescence (hereinafter, abbreviated as "EL") display panel, and a plasma display panel.

Among these, a liquid crystal cell or an organic EL display panel is preferable. That is, as the display device according to the embodiment of the present invention, a liquid crystal display device obtained by using a liquid crystal cell as a display element or an organic EL display device obtained by using an organic EL display panel as a display element is preferable.

Some image display devices are thin and can be formed into a curved surface. Since a light absorption anisotropic absorption film used in the present invention is thin and easily bent, the light absorption anisotropic film can be suitably applied to an image display device having a curved display surface.

In addition, some image display devices have a pixel density of more than 250 ppi and are capable of high-definition display. The optical anisotropic absorption film used in the present invention can be suitably applied to such a high-definition image display device without causing moire.

Liquid Crystal Display Device

Preferred examples of the liquid crystal display device which is an example of the display device according to the embodiment of the present invention include an aspect in which the liquid crystal display device includes the above-described optical film including the polarizer and a liquid crystal cell.

Examples of the specific configuration thereof include a configuration in which the optical film according to the embodiment of the present invention is disposed on a front-side polarizing plate or a rear-side polarizing plate. In these configurations, the viewing angle at which the vertical direction or the horizontal direction is light-shielded can be controlled.

In addition, the optical film according to the embodiment of the present invention may be disposed on both the front-side polarizing plate and the rear-side polarizing plate. With such a configuration, it is possible to control the viewing angle in which omniazimuth is light-shielded and light is transmitted only in the front direction.

Furthermore, a plurality of the optical films according to the embodiment of the present invention may be laminated through a retardation layer. Transmission performance and light shielding performance can be controlled by controlling a retardation value and an optical axis direction. For example, the omniazimuth is light-shielded by arranging the polarizer, the optical laminate, a $\lambda/2$ wave plate (axis angle is an angle deviated by 45° from an alignment direction of the polarizer), and the optical film so that the viewing angle control in which light is transmitted only in the front direction can be made. As the retardation layer, a positive A-plate, a negative A-plate, a positive C-plate, a negative C-plate, a B plate, an O plate, or the like can be used. From the viewpoint of thinning the viewing angle control system, it is preferable that a thickness of the retardation layer is small as long as optical characteristics, mechanical properties, and manufacturing suitability are not impaired, and specifically, the thickness thereof is preferably 1 to 150 μm, more preferably 1 to 70 μm, and still more preferably 1 to 30 μm.

Hereinafter, the liquid crystal cell constituting the liquid crystal display device will be described in detail.

Liquid Crystal Cell

It is preferable that the liquid crystal cell used for the liquid crystal display device is in a vertical alignment (VA) mode, an optically compensated bend (OCB) mode, an in-plane-switching (IPS) mode, or a twisted nematic (TN) mode, but the present invention is not limited thereto.

In the liquid crystal cell in a TN mode, rod-like liquid crystalline molecules are substantially horizontally aligned at the time of no voltage application and further twisted aligned at 60° to 120°. The liquid crystal cell in a TN mode is most frequently used as a color TFT liquid crystal display device and is described in a plurality of documents.

In the liquid crystal cell in a VA mode, rod-like liquid crystalline molecules are substantially vertically aligned at the time of no voltage application. The concept of the liquid crystal cell in a VA mode includes (1) a liquid crystal cell in a VA mode in a narrow sense where rod-like liquid crystalline molecules are aligned substantially vertically at the time of no voltage application and substantially horizontally at the time of voltage application (described in JP1990-176625A (JP-H2-176625A)), (2) a liquid crystal cell (in an MVA mode) (SID97, described in Digest of tech. Papers (proceedings) 28 (1997) 845) in which the VA mode is formed to have multi-domain in order to expand the viewing angle, (3) a liquid crystal cell in a mode (n-ASM mode) in which rod-like liquid crystalline molecules are substantially vertically aligned at the time of no voltage application and twistedly multi-domain aligned at the time of voltage application (described in proceedings of Japanese Liquid Crystal Conference, pp. 58 to 59 (1998)), and (4) a liquid crystal cell in a SURVIVAL mode (presented at LCD International 98). In addition, the liquid crystal cell may be of any of a patterned vertical alignment (PVA) type, a photo-alignment (optical alignment) type, or a polymer-sustained alignment (PSA) type. The details of these modes are described in JP2006-215326A and JP2008-538819A.

In the liquid crystal cell in an IPS mode, liquid crystalline compounds are aligned substantially parallel to the substrate, and the liquid crystalline molecules respond planarly through application of an electric field parallel to the substrate surface. That is, the liquid crystalline compounds are aligned in the plane in a state where no electric field is applied. In the IPS mode, black display is carried out in a state where no electric field is applied, and absorption axes of a pair of upper and lower polarizing plates are orthogonal to each other. A method of reducing leakage light during black display in an oblique direction and improving the viewing angle using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), and JP1998-307291A (JP-H10-307291A).

Organic EL Display Device

Suitable examples of the organic EL display device which is an example of the display device according to the embodiment of the present invention include an aspect of including the above-described optical film including the polarizer, a $\lambda/4$ plate, and an organic EL display panel in this order from the viewing side.

In addition, similarly to the liquid crystal display device described above, a plurality of the optical films according to the embodiment of the present invention may be laminated through a retardation layer and disposed on the organic EL display panel. Transmission performance and light shielding performance can be controlled by controlling a retardation value and an optical axis direction.

In addition, the organic EL display panel is a display panel formed of an organic EL element obtained by sandwiching an organic light emitting layer (organic electroluminescence layer) between electrodes (between a cathode and an anode). The configuration of the organic EL display panel is not particularly limited, and a known configuration is employed.

EXAMPLES

Hereinafter, the present invention will be described in more detail with reference to Examples. Materials, used amounts, ratios, treatment contents, treatment procedures, and the like described in Examples can be appropriately changed without departing from the spirit of the present invention. Therefore, the scope of the present invention should not be construed as being limited to Examples.

Example 1

Formation of Alignment Film 1

A surface of a cellulose acylate film 1 (TAC base material having a thickness of 40 μm; TG40 manufactured by FUJI-FILM Corporation) as a transparent film base material was saponified with an alkaline solution, and coated with the following coating liquid 1 for forming an alignment film using a wire bar.

The cellulose acylate film 1 on which the coating film had been formed was dried with hot air at 60° C. for 60 seconds, and further dried with hot air at 100° C. for 120 seconds to form an alignment film 1, thereby obtaining a TAC film with an alignment film.

A thickness of the alignment film 1 was 0.5

In addition, the produced TAC film with an alignment film was used by performing a rubbing treatment on the surface of the alignment film.

| (Coating liquid 1 for forming alignment film) | |
|---|---|
| Modified polyvinyl alcohol shown below | 3.80 parts by mass |
| Initiator Irg2959 | 0.20 parts by mass |
| Water | 70 parts by mass |
| Methanol | 30 parts by mass |

Modified polyvinyl alcohol

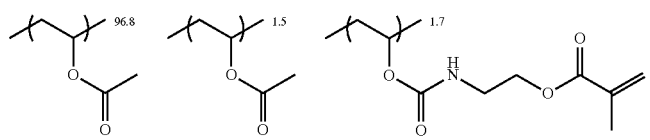

Production of Light Absorption Anisotropic Layer

The following composition P1 for forming a light absorption anisotropic layer was applied onto the alignment film of the produced TAC film with an alignment film using a wire bar to form a coating layer P1.

Next, the coating layer P1 was heated at 120° C. for 30 seconds, and cooled to 100° C.

Thereafter, the coating layer was irradiated with an LED lamp (central wavelength of 365 nm) for 10 seconds under an irradiation condition of an illuminance of 200 mW/cm², thereby preparing a light absorption anisotropic layer P1 on the alignment layer 1.

The thickness of the light absorption anisotropic layer P1 was 3.0 μm.

| Composition P1 for forming light absorption anisotropic layer | |
|---|---|
| Liquid crystalline compound L1 shown below | 90 parts by mass |
| Liquid crystalline compound L2 shown below | 10 parts by mass |
| Dichroic substance Y1 shown below | 3 parts by mass |
| Dichroic substance O1 shown below | 2 parts by mass |
| Dichroic substance C1 shown below | 4 parts by mass |
| Polymerization initiator I1 IRGACURE OXE-02 (manufactured by BASF SE) | 3 parts by mass |
| Interface improver F1 shown below | 0.1 parts by mass |
| Vertical alignment agent F2 shown below | 1 part by mass |
| Cyclopentanone (CPO) | 500 parts by mass |
| Tetrahydrofuran (THF) | 500 parts by mass |

Formation of Barrier Layer 1

The produced light absorption anisotropic layer P1 was coated with the following coating liquid for forming a barrier layer using a wire bar to form a coating film, and the coating film was dried at 80° C. for 5 minutes.

Next, the dried coating film was irradiated with an LED lamp (central wavelength: 365 nm) for 2 seconds under an irradiation condition of an illuminance of 150 mW/cm² in an environment of an oxygen concentration of 100 ppm and a temperature of 60° C., thereby forming a barrier layer 1 on the light absorption anisotropic layer P1.

A thickness of the barrier layer 1 was 1.0 μm.

In the above-described manner, an optical film P1 including the transparent film base material, the alignment film, the light absorption anisotropic layer, and the barrier layer was obtained.

| (Coating liquid for forming barrier layer) | |
|---|---|
| Modified polyvinyl alcohol shown below | 3.80 parts by mass |
| Initiator Irg2959 | 0.20 parts by mass |
| Water | 70 parts by mass |
| Methanol | 30 parts by mass |

Production of Laminate A1

A polarizing plate 1 having a thickness of 8 μm, in which one surface of the polarizer was exposed, was produced by the same method as that for a polarizing plate 02 with a one-surface protective film, described in WO2015/166991A.

The exposed surface of the above-described polarizing plate 1 and the surface of the optical film P1 produced above were subjected to a corona treatment, and the polarizer and the barrier layer 1 of the optical film P1 were bonded to each other using the following PVA adhesive 1, thereby producing a laminate A1.

Preparation of PVA Adhesive 1

20 parts of methylol melamine with respect to 100 parts of a polyvinyl alcohol-based resin containing an acetoacetyl group (average degree of polymerization: 1200, degree of saponification: 98.5% by mole, degree of acetoacetylation: 5% by mole) was dissolved in pure water under a temperature condition of 30° C. to prepare an aqueous solution in which the concentration of solid contents was adjusted to 3.7%.

Preparation of Image Display Device B1 with Reflection Prevention System

A GALAXY S4 (manufactured by SAMSUNG Electronics Co., Ltd.) equipped with an organic EL panel (organic EL display element) was disassembled, a touch panel with a circularly polarizing plate was peeled off from an organic EL display device, the circularly polarizing plate was further peeled off from the touch panel, the organic EL display element, the touch panel, and the circularly polarizing plate were isolated from each other, and the isolated circularly polarizing plate was re-bonded to the organic EL display element. Furthermore, the laminate A1 was laminated on the re-bonded circularly polarizing plate using the following pressure sensitive adhesive sheet. In this case, the lamination was carried out such that the transmission axis of the polarizer in the circularly polarizing plate and the transmission axis of the polarizer in the laminate A1 were parallel to each other. As a result, an image display device B1 with a reflected glare prevention system was produced.

Production of Pressure Sensitive Adhesive Sheet 1

An acrylate-based polymer was prepared according to the following procedure. 95 parts by mass of butyl acrylate and 5 parts by mass of acrylic acid were polymerized by a solution polymerization method in a reaction container equipped with a cooling pipe, a nitrogen introduction pipe, a thermometer, and a stirrer, thereby obtaining an acrylate-based polymer A1 with an average molecular weight of 2,000,000 and a molecular weight distribution (Mw/Mn) of 3.0.

Next, the obtained acrylate-based polymer A1 (100 parts by mass), CORONATE L (75% by mass ethyl acetate solution of a trimethylolpropane adduct of tolylene isocyanate, number of isocyanate groups in one molecule: 3, manufactured by Nippon Polyurethane Industry Co., Ltd.) (1.0 part by mass), and a silane coupling agent KBM-403 (manufactured by Shin-Etsu Chemical Co., Ltd.) (0.2 parts by mass) were mixed with each other, and ethyl acetate was added to the obtained mixture so that the concentration of total solid content was finally 10% by mass to prepare a composition for forming a pressure sensitive adhesive. A separate film subjected to a surface treatment with a silicone-based release agent was coated with the composition using a die coater, and the coating film was dried in an environment of 90° C. for 1 minute to obtain an acrylate-based pressure sensitive adhesive sheet. A film thickness of the obtained acrylate-based pressure sensitive adhesive sheet was 25 μm, and a storage elastic modulus thereof was 0.1 MPa.

Evaluation (1) Transmittance Central Axis Angle θ

In a case where a transmittance central axis angle θ was measured by the above-described method using the produced optical film P1, the transmittance central axis angle θ was 0°. Since none of the layer configurations of the optical film P1 other than the light absorption anisotropic layer P1 had absorption anisotropy, the value of the light absorption anisotropic layer P1 of the optical film P1 could be used as the transmittance central axis angle θ calculated above.

(2) Contrast

The Mueller matrix of the optical film at a wavelength of 550 nm was measured while the polar angle was changed for every 10 degrees from −60 degrees to 60 degrees with the produced light absorption anisotropic layer P1 using AxoScan OPMF-1 (manufactured by Opto Science, Inc.). After removing influence of surface reflection, a transmittance (Tm0) of the front surface and a transmittance (Tm30) of 30° were calculated, and a contrast (CR) was evaluated by the following expression.

CR=Tm0/Tm30

A: Cr was 1.7 or more.
B: Cr was 1.4 or more and less than 1.7.
C: Cr was 1.1 or more and less than 1.4.
D: Cr was less than 1.1.

(3) Hue Change

The produced image display device B1 with a reflected glare prevention system displayed white images (R256, G256, and B256) on the entire surface in order to evaluate a reflected image on window glass.

Next, an acrylic plate was installed in place of the window glass in front of the reflected image evaluation device, hues of images reflected on the surface were subjected to sensory evaluation, and tints (redness, greenness, and blueness) were evaluated. At this time, the direction of observing the reflected images was set to an oblique direction at an angle of approximately 30° with respect to a straight line extending from the center of the image display device to the front direction of the acrylic plate, and the reflected images were observed and evaluated according to the following standard. The results are shown in Table 1 below.

A: hue change of the reflected image was small, and the reflected image was not noticeable.
B: hue change of the reflected image was confirmed, but the reflected image was not noticeable and the hue change was at an acceptable level.
C: hue change of the reflected image was confirmed, and the reflected image was slightly noticeable.
D: hue change of the reflected image was clearly confirmed, and the reflected image was noticeable.

Examples 2 to 8 and Comparative Examples 1 to 3

Light absorption anisotropic layers, optical films, laminates, and image display devices with a reflected glare prevention system of Examples 2 to 8 and Comparative Examples 1 to 3 were produced in the same manner as in Example 1, except that the formulation of the composition P1 for forming a light absorption anisotropic layer was changed to that shown in Table 1 below, and the coating conditions (polymerization temperature) were changed to those shown in Table 1 below, and the same evaluations were performed.

The transmittance central axis angles θ of the light absorption anisotropic layers produced in Examples 2 to 8 and Comparative Examples 1 to 3 were all 0°.

In addition, in Table 1, the liquid crystal phase state of the liquid crystalline compound at the polymerization temperature is indicated in the item of coating conditions, but it was confirmed by observation using an optical microscope that the liquid crystalline compound L6 used in Comparative Example 2 exhibited only a nematic phase as the liquid crystal phase.

TABLE 1

| | Liquid crystal composition | | | | | | | | | Coating condition Polymerization temperature and liquid crystal phase at polymerization temperature | Performance | | Thickness |
|---|---|---|---|---|---|---|---|---|---|---|---|---|---|
| | Liquid crystal compound | Liquid crystal compound | Dichroic substance | Dichroic substance | Dichroic substance | Interface improver | Alignment agent | Alignment agent | Polymerization initiator | Solvent (mass ratio) | Coloring agent concentration in solid contents | | Contrast / Hue change | |
| Example 1 | L1 90 parts by mass | L2 10 parts by mass | Y1 3.0 parts by mass | O1 2.0 parts by mass | C1 4.0 parts by mass | F1 0.1 parts by mass | F2 1.2 parts by mass | — | I1 3.0 parts by mass | CPO/THF (50/50) | 8.0 wt% | 100° C. SmA | C / B | 3.0 μm |
| Example 2 | L3 100 parts by mass | — | Y2 3.0 parts by mass | O2 2.0 parts by mass | C1 4.0 parts by mass | F1 0.1 parts by mass | F3 1.0 part by mass | — | I1 3.0 parts by mass | CPO/THF (50/50) | 8.0 wt% | 80° C. SmB | A / B | 3.0 μm |
| Example 3 | L3 100 parts by mass | — | Y1 4.7 parts by mass | O1 4.5 parts by mass | C1 5.0 parts by mass | F1 0.1 parts by mass | F2 1.2 parts by mass | — | I1 3.0 parts by mass | CPO/THF (50/50) | 12.0 wt% | 80° C. SmB | A / A | 2.0 μm |
| Example 4 | L3 100 parts by mass | — | Y1 4.7 parts by mass | O1 4.5 parts by mass | C1 5.0 parts by mass | F1 0.1 parts by mass | F2 0.7 parts by mass | F3 0.7 parts by mass | I1 3.0 parts by mass | CPO/THF (50/50) | 12.0 wt% | 80° C. SmB | A / A | 2.0 μm |
| Example 5 | L4 75 parts by mass | L5 25 parts by mass | Y1 3.0 parts by mass | O1 2.0 parts by mass | C1 4.1 parts by mass | F1 0.1 parts by mass | F2 0.7 parts by mass | F3 0.7 parts by mass | I1 3.0 parts by mass | CPO/THF (50/50) | 8.0 wt% | 80° C. SmB | A / B | 3.0 μm |
| Example 6 | L4 75 parts by mass | L5 25 parts by mass | Y1 3.0 parts by mass | O2 2.0 parts by mass | C1 4.1 parts by mass | F1 0.1 parts by mass | F4 0.5 parts by mass | F5 1.5 parts by mass | I1 3.0 parts by mass | NMP (100) | 8.0 wt% | 80° C. SmB | B / B | 3.0 μm |
| Example 7 | L3 100 parts by mass | — | — | O1 6.6 parts by mass | — | F1 0.1 parts by mass | F2 1.5 parts by mass | — | I1 3.0 parts by mass | CPO/THF (50/50) | 6.0 wt% | 80° C. SmB | C / C | 4.0 μm |
| Example 8 | L3 100 parts by mass | — | Y2 3.4 parts by mass | O1 3.5 parts by mass | C2 2.5 parts by mass | F1 0.1 parts by mass | F2 2.5 parts by mass | F3 2.5 parts by mass | I1 3.0 parts by mass | CPO/THF (50/50) | 8.0 wt% | 80° C. SmB | B / B | 3.0 μm |
| Comparative Example 1 | L3 100 parts by mass | — | Y1 1.8 parts by mass | O1 1.5 parts by mass | C1 1.0 part by mass | F1 0.1 parts by mass | F2 1.2 parts by mass | — | I1 3.0 parts by mass | CPO/THF (50/50) | 4.0 wt% | 80° C. SmB | D / D | 4.5 μm |
| Comparative Example 2 | L6 100 parts by mass | — | — | O1 6.6 parts by mass | — | F1 0.1 parts by mass | F2 1.0 part by mass | — | I1 3.0 parts by mass | CPO/THF (50/50) | 6.0 wt% | 80° C. N | D / C | 4.0 μm |
| Comparative Example 3 | L3 100 parts by mass | — | Y1 3.0 parts by mass | O1 2.0 parts by mass | C1 4.0 parts by mass | F1 0.1 parts by mass | F2 1.2 parts by mass | — | I1 3.0 parts by mass | CPO/THF (50/50) | 8.0 wt% | 80° C. SmB | D / D | 3.0 μm |

Components denoted by symbols in Table 1 are shown below.
Liquid crystalline compound L1

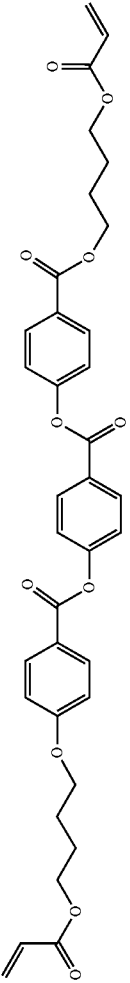

TABLE 1-continued

TABLE 1-continued

TABLE 1-continued

Alignment agent F3: [structure shown]

Alignment agent F4: [structure shown]

Alignment agent F5: [structure shown]

From the results shown in Table 1, it was found that, in a case where the content of the dichroic substance was less than 5.0% by mass with respect to the total solid content mass of the liquid crystal composition, the contrast was low and the change in tint of the reflected image relative to the original image was large (Comparative Example 1).

In addition, it was found that, in a case where a liquid crystalline compound not exhibiting a liquid crystal state of a smectic phase was used, the contrast was low (Comparative Example 2).

Furthermore, it was found that, in a case where the alignment agent was not blended, the contrast was low and the change in tint of the reflected image relative to the original image was large (Comparative Example 3).

On the other hand, it was found that, in a case of using the liquid crystalline compound containing the alignment agent, in which the liquid crystalline compound exhibiting a liquid crystal state of a smectic phase was used and the content of the dichroic substance was 5.0% by mass or more with respect to the total solid content mass of the liquid crystal composition, the contrast was high and the change in tint of the reflected image relative to the original image was small (Examples 1 to 8).

In particular, based on the comparison between Example 1 and Example 2, it was found that, in a case where the liquid crystalline compound exhibiting a higher-order smectic phase was used, the contrast was higher.

In addition, based on the comparison between Example 2 and Example 3, and comparison between Example 4 and Example 5, it was found that, in a case where the content of the dichroic substance was 10.0% by mass or more with respect to the total solid content mass of the liquid crystal composition, the change in tint of the reflected image relative to the original image was smaller.

In addition, based the comparison between Example 5 and Example 6, it was found that, in a case where the alignment agent was the compound represented by Formula (B1) or (B2) described above, the contrast was higher.

In addition, based the comparison between Example 2 and Example 7, it was found that, in a case of using two or more kinds of dichroic substances in combination, the contrast was higher and the change in tint of the reflected image relative to the original image was smaller.

What is claimed is:

1. A light absorption anisotropic layer formed of a liquid crystal composition containing a liquid crystalline compound, a dichroic substance, and an alignment agent,
   wherein the liquid crystalline compound is a liquid crystalline compound exhibiting a liquid crystal state of a smectic phase,
   the content of the dichroic substance is 5.0% by mass or more with respect to the total solid content mass of the liquid crystal composition,
   the light absorption anisotropic layer has a transmittance central axis,
   the light absorption anisotropic layer has a surface, and
   the angle θ between the transmittance central axis of the light absorption anisotropic layer and a normal direction of the surface of the light absorption anisotropic layer is 0° or more and 45° or less.

2. The light absorption anisotropic layer according to claim 1,
   wherein the content of the dichroic substance is 8.0% by mass or more with respect to the total solid content mass of the liquid crystal composition.

3. The light absorption anisotropic layer according to claim 1,
   wherein the content of the dichroic substance is 10.0% by mass or more with respect to the total solid content mass of the liquid crystal composition.

4. The light absorption anisotropic layer according to claim 1,
   wherein the content of the dichroic substance is 2 to 100 parts by mass with respect to 1 part by mass of the alignment agent.

5. The light absorption anisotropic layer according to claim 1,
   wherein the dichroic substance includes at least one dichroic substance having a maximal absorption wavelength in a wavelength range of 370 to 550 nm and at least one dichroic substance having a maximal absorption wavelength in a wavelength range of 500 to 700 nm.

6. The light absorption anisotropic layer according to claim 1,
   wherein the thickness of the light absorption anisotropic layer is 1.5 μm or more.

7. The light absorption anisotropic layer according to claim 1,
   wherein the thickness of the light absorption anisotropic layer is 4.0 μm or less.

8. The light absorption anisotropic layer according to claim 1,
   wherein the liquid crystalline compound is a liquid crystalline compound exhibiting any liquid crystal state of a smectic B phase, a smectic E phase, a smectic F phase, a smectic G phase, a smectic H phase, a smectic I phase, a smectic J phase, a smectic K phase, or a smectic L phase.

9. The light absorption anisotropic layer according to claim 1,
   wherein the alignment agent is a compound represented by Formula (B1) or (B2),

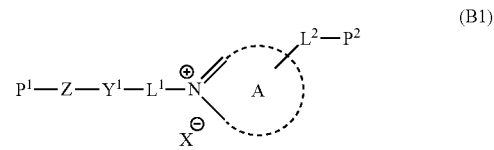

(B1)

(B2)

wherein, in Formulae (B1) and (B2), a ring A represents a quaternary ammonium ion consisting of a nitrogen-containing heterocyclic ring, X represents an anion, $L^1$ represents a divalent linking group, $L^2$ represents a single bond or a divalent linking group, $Y^1$ represents a divalent linking group having a 5-membered ring or a 6-membered ring as a partial structure, Z represents a divalent linking group having an alkylene group having 2 to 20 carbon atoms as a partial structure, $P^1$ and $P^2$ each independently represent a monovalent substituent having a polymerizable ethylenically unsaturated bond, $R^1$ and $R^2$ each independently represent a hydrogen atom, an aliphatic hydrocarbon group which may have a substituent, an aryl group which may have a substituent, or a heterocyclic group which may have a substituent, and $R^3$ represents a substituent.

10. The light absorption anisotropic layer according to claim 1,
wherein the alignment agent is at least one compound selected from the group consisting of a nonionic silane compound and an ionic compound.

11. An optical film comprising:
a transparent film base material; and
the light absorption anisotropic layer according to claim 1, which is provided on the transparent film base material.

12. The optical film according to claim 11, further comprising:
an alignment film between the transparent film base material and the light absorption anisotropic layer.

13. A viewing angle control system comprising:
a polarizer having an absorption axis in an in-plane direction; and
the light absorption anisotropic layer according to claim 1.

14. An image display device comprising:
a display element; and
the viewing angle control system according to claim 13,
wherein the viewing angle control system is disposed on at least one main surface of the display element.

15. The image display device according to claim 14,
wherein the light absorption anisotropic layer included in the viewing angle control system is disposed on a viewing side with respect to the polarizer included in the viewing angle control system.

16. The light absorption anisotropic layer according to claim 2,
wherein the content of the dichroic substance is 10.0% by mass or more with respect to the total solid content mass of the liquid crystal composition.

17. The light absorption anisotropic layer according to claim 2,
wherein the content of the dichroic substance is 2 to 100 parts by mass with respect to 1 part by mass of the alignment agent.

18. The light absorption anisotropic layer according to claim 2,
wherein the dichroic substance includes at least one dichroic substance having a maximal absorption wavelength in a wavelength range of 370 to 550 nm and at least one dichroic substance having a maximal absorption wavelength in a wavelength range of 500 to 700 nm.

19. The light absorption anisotropic layer according to claim 2,
wherein the liquid crystalline compound is a liquid crystalline compound exhibiting any liquid crystal state of a smectic B phase, a smectic E phase, a smectic F phase, a smectic G phase, a smectic H phase, a smectic I phase, a smectic J phase, a smectic K phase, or a smectic L phase.

20. The light absorption anisotropic layer according to claim 2,
wherein the alignment agent is at least one compound selected from the group consisting of a nonionic silane compound and an ionic compound.

* * * * *